(12) United States Patent
Wang et al.

(10) Patent No.: US 12,016,069 B2
(45) Date of Patent: *Jun. 18, 2024

(54) METHOD FOR TRANSMITTING CONTROL SIGNALING IN RELAY NETWORK, CONFIGURATION METHOD AND DEVICE

(71) Applicant: Samsung Electronics Co., Ltd., Suwon-si (KR)

(72) Inventors: Weiwei Wang, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,921

(22) Filed: Apr. 4, 2022

(65) Prior Publication Data
US 2022/0232651 A1 Jul. 21, 2022

Related U.S. Application Data

(63) Continuation of application No. 16/672,351, filed on Nov. 1, 2019, now Pat. No. 11,297,669.

(30) Foreign Application Priority Data

Nov. 2, 2018 (CN) .......................... 201811303678.1
Aug. 14, 2019 (CN) .......................... 201910748988.2

(51) Int. Cl.
*H04W 76/15* (2018.01)
*H04B 7/155* (2006.01)
(Continued)

(52) U.S. Cl.
CPC ............ *H04W 76/15* (2018.02); *H04B 7/155* (2013.01); *H04L 41/0806* (2013.01);
(Continued)

(58) Field of Classification Search
None
See application file for complete search history.

(56) References Cited

U.S. PATENT DOCUMENTS 10,492,193 B2   11/2019   Lai et al.
11,039,485 B2*   6/2021   Chang .................. H04W 76/10
(Continued)

FOREIGN PATENT DOCUMENTS

CN   102498749 A   6/2012
CN   102811468 A   12/2012
(Continued)

OTHER PUBLICATIONS

"Study on Integrated Access and Backhaul" 3GPP TR 38.874 v0.6.2 (Nov. 2018).*

(Continued)

*Primary Examiner* — Andrew C Oh

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to the present application, a method for transmitting control signaling in a relay network comprises: a second relay node acquires a first control signaling and a second control signaling, wherein the first control signaling contains an F1AP message; the second relay node processes the first control signaling and the second control signaling in the same manner or different manners; and the second relay node transmits the first control signaling and the second control signaling to a first relay node.

12 Claims, 13 Drawing Sheets

(51) Int. Cl.
*H04L 41/0806* (2022.01)
*H04W 28/02* (2009.01)
*H04W 72/20* (2023.01)
*H04W 72/56* (2023.01)
*H04W 80/02* (2009.01)

(52) U.S. Cl.
CPC ....... *H04W 28/0252* (2013.01); *H04W 72/20* (2023.01); *H04W 72/56* (2023.01); *H04W 80/02* (2013.01)

(56) References Cited

U.S. PATENT DOCUMENTS

| | | | |
|---|---|---|---|
| 11,140,695 B1 * | 10/2021 | Eyuboglu | H04W 72/535 |
| 11,202,333 B2 * | 12/2021 | Zhang | H04W 12/0431 |
| 11,297,669 B2 * | 4/2022 | Wang | H04L 41/0806 |
| 2011/0058521 A1 | 3/2011 | Xu et al. | |
| 2011/0164550 A1 | 7/2011 | Chen et al. | |
| 2012/0033603 A1 | 2/2012 | Seo et al. | |
| 2012/0184204 A1 | 7/2012 | Kazmi et al. | |
| 2012/0315916 A1 | 12/2012 | Van Phan et al. | |
| 2013/0044721 A1 | 2/2013 | Yang et al. | |
| 2014/0010192 A1 * | 1/2014 | Chang | H04L 5/0044 370/329 |
| 2015/0117208 A1 | 4/2015 | Radulescu et al. | |
| 2015/0131618 A1 | 5/2015 | Chen | |
| 2016/0021567 A1 * | 1/2016 | Agiwal | H04W 76/15 370/329 |
| 2017/0005913 A1 | 1/2017 | Hampel et al. | |
| 2017/0006499 A1 | 1/2017 | Hampel et al. | |
| 2017/0251395 A1 | 8/2017 | Hapsari et al. | |
| 2017/0347302 A1 | 11/2017 | Li et al. | |
| 2018/0249375 A1 * | 8/2018 | Goldhamer | H04L 1/1812 |
| 2018/0270730 A1 | 9/2018 | Martin | |
| 2018/0279196 A1 | 9/2018 | Takagi et al. | |
| 2018/0324752 A1 * | 11/2018 | Kim | H04W 68/02 |
| 2018/0332516 A1 | 11/2018 | Oak et al. | |
| 2018/0338277 A1 * | 11/2018 | Byun | H04W 74/0833 |
| 2018/0352491 A1 | 12/2018 | Shih et al. | |
| 2018/0368109 A1 * | 12/2018 | Kim | H04W 72/04 |
| 2018/0368167 A1 * | 12/2018 | Kim | H04W 72/0446 |
| 2018/0368205 A1 * | 12/2018 | Park | H04W 76/30 |
| 2019/0014490 A1 | 1/2019 | Kim et al. | |
| 2019/0037631 A1 * | 1/2019 | Byun | H04W 76/20 |
| 2019/0045034 A1 | 2/2019 | Alam | |
| 2019/0053193 A1 * | 2/2019 | Park | H04W 72/51 |
| 2019/0059027 A1 * | 2/2019 | Yang | H04W 36/0066 |
| 2019/0069333 A1 * | 2/2019 | Kim | H04W 36/0033 |
| 2019/0075571 A1 | 3/2019 | Abedini et al. | |
| 2019/0132847 A1 | 5/2019 | Abedini et al. | |
| 2019/0166526 A1 * | 5/2019 | Xu | H04W 76/22 |
| 2019/0350023 A1 | 11/2019 | Novlan et al. | |
| 2019/0373519 A1 * | 12/2019 | Yiu | H04W 36/02 |
| 2019/0387444 A1 * | 12/2019 | Byun | H04W 36/08 |
| 2020/0044732 A1 | 2/2020 | Cui et al. | |
| 2020/0084655 A1 * | 3/2020 | Fiorani | H04W 24/08 |
| 2020/0112953 A1 | 4/2020 | Bendlin et al. | |
| 2020/0162211 A1 * | 5/2020 | Wang | H04L 5/0044 |
| 2020/0163130 A1 | 5/2020 | Hori et al. | |
| 2020/0178113 A1 | 6/2020 | Jin et al. | |
| 2020/0178326 A1 * | 6/2020 | Sirotkin | H04W 76/12 |
| 2020/0196374 A1 * | 6/2020 | Lim | H04W 80/02 |
| 2020/0214063 A1 | 7/2020 | Hori et al. | |
| 2020/0229023 A1 | 7/2020 | Ke et al. | |
| 2020/0229049 A1 | 7/2020 | Wu et al. | |
| 2020/0252988 A1 * | 8/2020 | Wang | H04W 76/27 |
| 2020/0275519 A1 * | 8/2020 | Sharma | H04W 80/02 |
| 2020/0323016 A1 * | 10/2020 | Zhang | H04W 56/00 |
| 2020/0383164 A1 * | 12/2020 | Kim | H04W 76/12 |
| 2020/0396740 A1 * | 12/2020 | Toeda | H04W 72/541 |
| 2021/0204341 A1 * | 7/2021 | Liu | H04W 76/15 |
| 2021/0258244 A1 | 8/2021 | Xu et al. | |
| 2021/0274404 A1 | 9/2021 | Koziol et al. | |
| 2021/0298116 A1 * | 9/2021 | Toeda | H04W 80/02 |
| 2021/0321298 A1 | 10/2021 | Keskitalo et al. | |
| 2021/0329456 A1 * | 10/2021 | Preda | H04W 12/69 |
| 2021/0329629 A1 | 10/2021 | Xu et al. | |
| 2021/0345322 A1 | 11/2021 | Tiirola et al. | |
| 2021/0345440 A1 * | 11/2021 | Fiorani | H04W 24/08 |
| 2021/0409328 A1 * | 12/2021 | Xu | H04W 8/26 |
| 2022/0039189 A1 * | 2/2022 | Wu | H04W 74/0833 |

FOREIGN PATENT DOCUMENTS

| | | | | |
|---|---|---|---|---|
| CN | 110475351 A | * | 5/2018 | ......... H04B 7/15528 |
| CN | 110072297 A | * | 7/2019 | ............. H04L 67/28 |
| CN | 110351700 A | * | 10/2019 | ............ H04W 40/02 |
| CN | 110475267 A | * | 11/2019 | ............ H04W 24/02 |
| CN | 110475351 A | * | 11/2019 | ......... H04B 7/15528 |
| CN | 110475368 A | * | 11/2019 | ............ H04B 7/022 |
| CN | 110636643 A | * | 12/2019 | ............ H04L 45/64 |
| CN | 113170360 A | * | 7/2021 | ........ H04W 36/0055 |
| CN | 113728720 A | * | 11/2021 | ............ H04W 76/12 |
| CN | 110958642 B | * | 4/2022 | ........... H04L 1/0079 |
| CN | 110856222 B | * | 6/2022 | ........... H04B 7/2606 |
| KR | 10-2012-0035932 A | | 4/2012 | |
| WO | 2014109685 A1 | | 7/2014 | |
| WO | 2015094256 A1 | | 6/2015 | |
| WO | 2016095831 A1 | | 6/2016 | |

OTHER PUBLICATIONS

3GPP TS 38.331 V15.7.0 (Sep. 2019), Technical Specification, 3rd Generation Partnership Project; Technical Specification Group Radio Access Network; NR; Radio Resource Control (RRC) protocol specification (Release 15), Sep. 2019, 527 pages.

3GPP TS 38.473 V15.7.0 (Sep. 2019), Technical Specification, 3rd Generation Partnership Project; Technical Specification Group Radio Access Network; NG-RAN; F1 application protocol (F1AP) (Release 15), Sep. 2019, 221 pages.

Samsung, "Overview on control signalling transmission in IAB," R2-1903685, 3GPP TSG-RAN WG2 Meeting #105bis, Xi'an, China, Apr. 8-12, 2019, 2 pages.

Samsung, "Control signalling mapping in IAB network," R3-193976, 3GPP TSG-RAN WG3 Meeting #105, Ljubljana, Slovenia, Aug. 26-30, 2019, 5 pages.

Supplementary European Search Report dated Sep. 29, 2021, in connection with European Patent Application No. 19880108.6, 8 pages.

Ericsson: "Transfer of L1-L2 configuration", 3GPP TSG RAN WG3 Meeting #98, Tdoc R3-174785, Reno, Nevada, USA, Nov. 27, 2017-Dec. 1, 2017, 6 pages.

Huawei et al: "Bearer mapping for control plane signaling in BH" 3GPP TSG-RAN WG2#103, R2-1812819, Gothenburg, Sweden, Aug. 20-24, 2018, 4 pages.

ISA/KR, International Search Report and Written Opinion of the International Searching Authority, International Application No. PCT/KR2019/014759, dated Feb. 11, 2020, 8 pages.

3GPP TR 38.874 V0.6.0 (Nov. 2018), Technical Report, 3rd Generation Partnership Project; Technical Specification Group Radio Access Network; Study on Integrated Access and Backhaul; (Release 15), Nov. 2018, 90 pages.

CATT, "Control Plane Considerations for L2 IAB Architectures," R2-1809819, 3GPP TSG-RAN WG2 AH-1807, Montreal, Canada, Jul. 2-Jul. 6, 2018, 8 pages.

Huawei/Hisilicon, "Distributed RRC functions for IAB," R2-1815505 (revision of R2-1812830), 3GPP TSG-RAN WG2#103bis, Chengdu, China, Oct. 8-12, 2018, 7 pages.

Intellectual Property India, "Examination report under sections 12 & 13 of the Patents Act" dated Feb. 23, 2022, in connection with Indian Patent Application No. 202117024407, 7 pages.

European Patent Office, "Communication pursuant to Article 94(3) EPC," dated Oct. 17, 2022, in connection with European Patent Application No. EP19880108.6, 5 pages.

China National Intellectual Property Administration, "The First Office Action" dated May 9, 2023, in connection with China Patent Application No. CN201910748988.2, 9 pages.

(56) References Cited

OTHER PUBLICATIONS

AT&T, "On backhauling of F1-U and F1-C for IAB with L2 relaying," 3GPP TSG-RAN WG3 #99bis R3-182297, Sanya, China, Apr. 2018, 7 pages.
Qualcomm Incorporated, "IAB—U-plane transport for L2-relaying," 3GPP TSG-RAN WG3 Meeting #99bis R3-181945, Sanya, China, Apr. 2018, 8 pages.
Qualcomm Incorporated, "IAB—C-plane transport in L2-relaying architecture," 3GPP TSG-RAN WG3 Meeting #99bis R3-181946, Sanya, China, Apr. 2018, 5 pages.
ZTE, "Discussion on IAB node resource allocation," 3GPP TSG-RAN WG2 Meeting #102 R2-1807402, Busan, Korea, May 2018, 4 pages.

\* cited by examiner

… (DU), and the central unit and the distribution unit communicate via an F1 interface. The central unit has at least a Radio Resource Control (RRC) protocol layer and a Packet Data Convergence Protocol (PDCP) protocol layer, etc., and may also contain a Service Data Adaptation Protocol (SDAP) protocol layer. The distribution unit has a Radio Link Control (RLC) protocol layer, a Medium Access Control (MAC) protocol layer, and a physical layer, etc. There is a standardized public interface F1 between CU and DU. The F1 interface is divided into a control plane F1-C and a user plane F1-U. The transport network layer of F1-C performs transmissions based on IP. In order to transmit signaling more reliably, an SCTP protocol is added on top of IP, and the protocol of the application layer of F1-C is F1AP. SCTP can provide reliable application layer message transmissions. The transport layer of F1-U is UDP/IP. GTP-U is on top of UDP/IP and is used to carry a Protocol Data Unit (PDU) of the user plane.

METHOD FOR TRANSMITTING CONTROL SIGNALING IN RELAY NETWORK, CONFIGURATION METHOD AND DEVICE

CROSS-REFERENCE TO RELATED APPLICATIONS

This application is a continuation of application Ser. No. 16/672,351, filed Nov. 1, 2019, which is based on and claims the benefit of priority under 35 U.S.C. § 119(a) of the Chinese patent application number 201811303678.1, filed on Nov. 2, 2018, in the Chinese Intellectual Property Office and the Chinese patent application number 201910748988.2, filed on Aug. 14, 2019, in the Chinese Intellectual Property Office, the disclosures of which are hereby incorporated by reference herein in their entirety.

BACKGROUND

1. Field

The present application relates to the technical field of wireless communications, and particularly to a method for transmitting control signaling in a relay network, and a configuration method of the same, devices and storage mediums.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a New Radio (NR) Access network or in the 5th generation (5G) network, an Integrated Access and Backhaul (IAB) topic is proposed, in order to extend the coverage of the network. The main purpose of the topic is to build a multi-hop network architecture, as shown in FIG. 1. A network architecture containing a donor node and two relay nodes is shown in FIG. 1, among which all users ultimately communicate with the donor node.

In this architecture, the donor node is a base station composed of a central unit (CU) and a distribution unit (DU), and the central unit and the distribution unit communicate via an F1 interface. The central unit has at least a Radio Resource Control (RRC) protocol layer and a Packet Data Convergence Protocol (PDCP) protocol layer, etc., and may also contain a Service Data Adaptation Protocol (SDAP) protocol layer. The distribution unit has a Radio Link Control (RLC) protocol layer, a Medium Access Control (MAC) protocol layer, and a physical layer, etc. There is a standardized public interface F1 between CU and DU. The F1 interface is divided into a control plane F1-C and a user plane F1-U. The transport network layer of F1-C performs transmissions based on IP. In order to transmit signaling more reliably, an SCTP protocol is added on top of IP, and the protocol of the application layer of F1-C is F1AP. SCTP can provide reliable application layer message transmissions. The transport layer of F1-U is UDP/IP. GTP-U is on top of UDP/IP and is used to carry a Protocol Data Unit (PDU) of the user plane.

Each of the relay nodes in the IAB network architecture consists of two parts: a distribution unit (DU) portion and a mobile terminal (MT) portion. The distribution unit portion includes only part of a protocol stack, such as the Radio Link Control (RLC), the Medium Access Control (MAC), and the physical layer, etc. The mobile terminal portion includes a complete protocol stack, such as the control plane including RRC/PDCP/RLC/MAC/PHY, and the user plane including SDAP/PDCP/RLC/MAC/PHY. The mobile terminal portion can act as a user to access network. A user can access the network through any one of the relay nodes, and can also through the donor node.

In the conventional technology, the control signaling in the network is only transferred inside the donor node, that is, it is transferred between the central unit CU and the distribution unit DU via the F1 interface. Therefore, although the IAB network architecture extends the relay nodes in the network, transmissions of the control signaling between the relay nodes have not been considered while designing the network in the prior art. Therefore, a solution that enables transmissions of the control signaling in the IAB network is required, such that the problems mentioned above can be at least partially addressed.

SUMMARY

In order to solve at least some of the above problems, the embodiments of the present application provide a method for transmitting control signaling in a relay network, a configuration method, and a device.

According to a first aspect of the present application, there provided a method for transmitting control signaling in a relay network, the method comprising: a second relay node acquiring a first control signaling and a second control signaling, wherein the first control signaling contains an F1AP (F1 application protocol) message; the second relay node processing the first control signaling and the second control signaling in the same manner or different manners; and the second relay node transmitting the first control signaling and the second control signaling to a first relay node.

Preferably, the second relay node processes the first control signaling and the second control signaling in different manners comprising: the second relay node using a first signaling radio bearer to carry the first control signaling containing the F1AP message, and using a second signaling radio bearer to carry the second control signaling; or the second relay node using different protocol layer entities to process the first control signaling and the second control signaling.

Preferably, the different protocol layer entities comprising: different PDCP layer entities; or different PDCP layer and different RLC layer entities.

Preferably, the first signaling radio bearer is one of the signaling radio bearers SRB0, SRB1, SRB1s, SRB2, SRB2s and SRB3; or the first signaling radio bearer is a new-defined signaling radio bearer.

Preferably, the first control signaling shares the same Backhaul Link channel with the second control signaling.

Preferably, the first control signaling shares the same Backhaul Link channel with the second control signaling comprising: the first control signaling and the second control signaling using the same RLC entity and a logical channel corresponding to the Backhaul Link channel, and using different PDCP entities; or the first control signaling and the second control signaling using the same logical channel corresponding to the Backhaul Link channel, and using different RLC entities and PDCP entities.

Preferably, further comprising: adding, respectively for the first control signaling and the second control signaling, indication information used to distinguish the first control signaling and the second control signaling, or indication information indicating the node processing the first control signaling and the second control signaling.

Preferably, the indication information comprising at least one of: information indicating the type of a data packet, identification information of a relay node and predefined information.

Preferably, further comprising: the second relay node processing at least two F1AP messages in the same or different manners.

According to a second aspect of the present application, there provided a configuration method for transmissions of control signaling in a relay network, the configuration method comprising: a first relay node receiving a first configuration message from a donor node, wherein the first configuration message is used for configuring a transmission of an F1AP message with a second relay node; and the first relay node sending a second configuration message to the second relay node, wherein the second configuration message is used for configuring a transmission of an F1AP message with the second relay node.

Preferably, the first configuration message comprising at least one of: identification information of the second relay node, information of an SRB that is required to be established or modified and information of a Backhaul Link channel that is required to be established.

Preferably, the second configuration message comprising at least the configuration information generated by the donor node for configuring the second relay node.

Preferably, before the first relay node receives the first configuration message from the donor node, further comprising: receiving indication information from the second relay node, and sending the indication information to the donor node; or sending indication information to the donor node.

Preferably, the indication information comprising at least one of: identification information of the second relay node, indication information indicating a successful configuration of the second relay node by Operations, Administration, and Maintenance (OAM), indication information indicating a distribution unit portion of the second relay node being able to work, indication information indicating that a distribution unit of the second relay node needs to establish an F1 interface, and indication information indicating that the node sending this indication message is a relay node.

Preferably, after a first relay node receives a first configuration message from the donor node and before the first relay node sends a second configuration message to the second relay node, the configuration method further comprising: the first relay node sends a third configuration message to the donor node; the first relay node receives a forth configuration message from the donor node.

Preferably, the third configuration message comprising at least one of: identification information of the second relay node, information on accepted SRB, information on accepted Backhaul Link channel, information on unaccepted SRB, information on unaccepted Backhaul Link channel, and configuration information generated by the first relay node for configuring the second relay node.

Preferably, the forth configuration message comprising at least one of: identification information of the second relay node and configuration information generated by the donor node for configuring the second relay node.

According to a third aspect of the present application, there provided a configuration method for transmissions of control signaling in a relay network, the configuration method comprising: a donor node sending a first configuration message to a first relay node, wherein the first configuration message is used for configuring a transmission of an F1AP message with a second relay node.

Preferably, the first configuration message comprising at least one of: identification information of the second relay node, information of an SRB that is required to be established or modified and information of a Backhaul Link channel that is required to be established.

Preferably, before the donor node sends the first configuration message to the first relay node, further comprising: receiving indication information from the first relay node.

Preferably, the indication information comprising at least one of: identification information of the second relay node, indication information indicating a successful configuration of the second relay node by OAM, indication information indicating a distribution unit portion of the second relay node being able to work, indication information indicating that a distribution unit of the second relay node needs to establish an F1 interface, and indication information indicating that the node sending this indication message is a relay node.

Preferably, after a first relay node receives a first configuration message from the donor node and before the first relay node sends a second configuration message to the second relay node, the configuration method further comprising: the first relay node sends a third configuration message to the donor node; the first relay node receives a forth configuration message from the donor node.

Preferably, the third configuration message comprising at least one of:

identification information of the second relay node, information on accepted SRB, information on accepted Backhaul Link channel, information on unaccepted SRB, information on unaccepted Backhaul Link channel, and configuration information generated by the first relay node for configuring the second relay node.

Preferably, the forth configuration message comprising at least one of: identification information of the second relay node and configuration information generated by the donor node for configuring the second relay node.

According to a forth aspect of the present application, there provided a relay node in a relay network, the relay node comprising: receiving module, configured to receive a first configuration message from a donor node, wherein the first configuration message is used for configuring a transmission of an F1AP message with a second relay node; and sending module, configured to send a second configuration message to the second relay node, wherein the second configuration message is used for configuring a transmission of an F1AP message with a second relay node.

According to a fifth aspect of the present application, there provided a donor node in a relay network, the donor node comprising: sending module, configured to send a first configuration message to a first relay node, wherein the first configuration message is used for configuring a transmission of an F1AP message with a second relay node.

According to a sixth aspect of the present application, there provided a computer readable storage medium having executable instructions stored thereon, which when executed by a processor, cause the processor to perform any of the methods described above.

According to a seventh aspect of the present application, there provided a device for transmitting control signaling in a relay network, comprising: processor; and memory, configured to store machine readable instructions, which when executed by the processor, cause the processor to perform the method of any of the methods described above.

According to the technical solution of the embodiment of the present application, a second relay node processes the acquired first control signaling and second control signaling in the same or different manners, thereby transmissions of control signaling between a first relay node and the second relay node in the relay network are achieved. By performing interactions of configuration messages between the donor node, the first relay node and the second relay node, the configuration of transmissions of control signaling between the first relay node and the second relay node is realized.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features, and advantages of the present application will become apparent from the following descriptions on embodiments of the present application with reference to the drawings, in which.

In the drawings, all same or similar arrangements are designated with same or similar reference numerals.

DETAILED DESCRIPTION OF EMBODIMENTS

Figure 1:
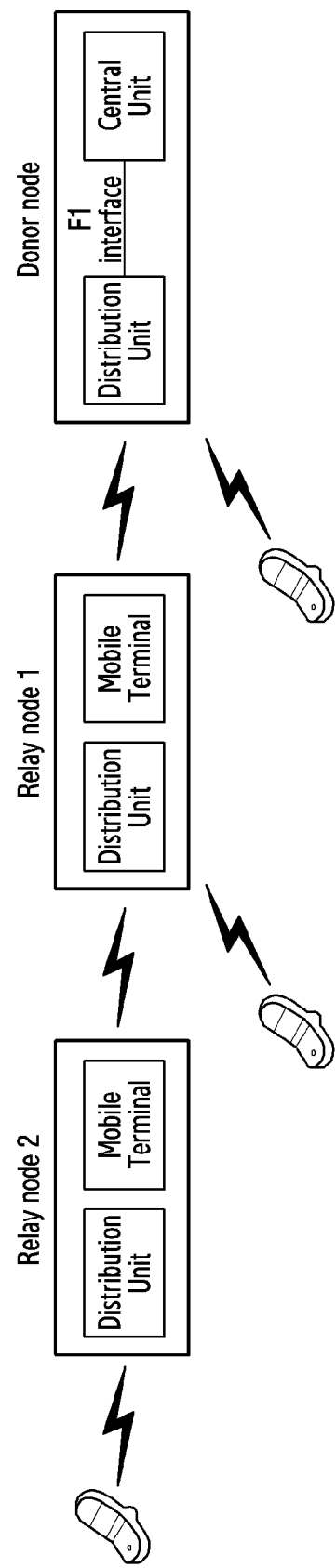
FIG. 1 illustrates a schematic diagram of an example network architecture of the relay network.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to make the objects, technical solutions and advantages of the present application more clear, detailed descriptions will be further made below with reference to the accompanying drawings. In the following detailed description, numerous specific details are set forth to provide a thorough understanding of the present application and claimed subject matter. However, it will be apparent to those ordinary ones skilled in the art that the present application and claimed subject matter may be practiced without these specific details. In other instances, well-known methods, procedures, components, materials and/or circuits have not been described in detail to avoid confusion.

Throughout the specification, references to "one embodiment", "an embodiment", "one example" or "an example" mean: particular features, structures, or characteristics described in connection with embodiments or examples are included in at least one embodiment of the present disclosure. Therefore, phrases such as "in one embodiment", "in an embodiment", "one example" or "an example" appearing throughout the specification do not necessarily refer to the one and the same embodiment or example. In addition, the particular features, structures, or characteristics may be combined in one or more embodiments or examples in any suitable combination and/or sub-combination. In addition, it should be understood by those ordinary ones skilled in the art, the drawings are provided for the purpose of illustration, and the drawings are not necessarily to scale. The term "and/or" used herein includes any and all combinations of one or more of the associated listed items.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The present disclosure relates to an apparatus and a method for an integrated access and backhaul (IAB) network. More specifically, the present disclosure describes control signaling for the IAB network comprising at least one of IAB donor node, IAB node, central unit (CU), distributed unit (DU), and so on.

The terms referring to control information used in the following description (e.g., a control signal, F1-C, control plane, control data, control signaling), the terms for signals (e.g., a signal, message, a packet data unit (PDU), a service data unit (SDU), the terms referring to data (e.g., information, value), the terms referring to network entities (e.g., a cell or a 5GNB, gNB, CU, DU, mobile termination (MT)), the terms referring to sending operations (e.g., request, response, report or transfer), and the terms referring to elements of the device are employed for convenience of description. Therefore, the present disclosure is not limited by the terms described below, and other terms having equivalent technical meanings may be used.

Although the present disclosure describes various embodiments based on the terms used in some communication standards (e.g., long-term evolution (LTE) and LTE-advanced (LTE-A) systems or new radio (NR) systems in 3rd generation partnership Project (3GPP)), they are only examples for the description. Various embodiments of the present disclosure may be easily modified and applied to other communication systems.

In the present disclosure, a message name is only an example, and other message names will not be excluded.

A method for transmitting control signaling according to an embodiment of the present application can enable transmissions of control signaling between relay nodes in an IAB network, which will be described below with references to FIG. 2. According to various embodiments, the relay node can be referred as 'IAB node'.

Figure 2:
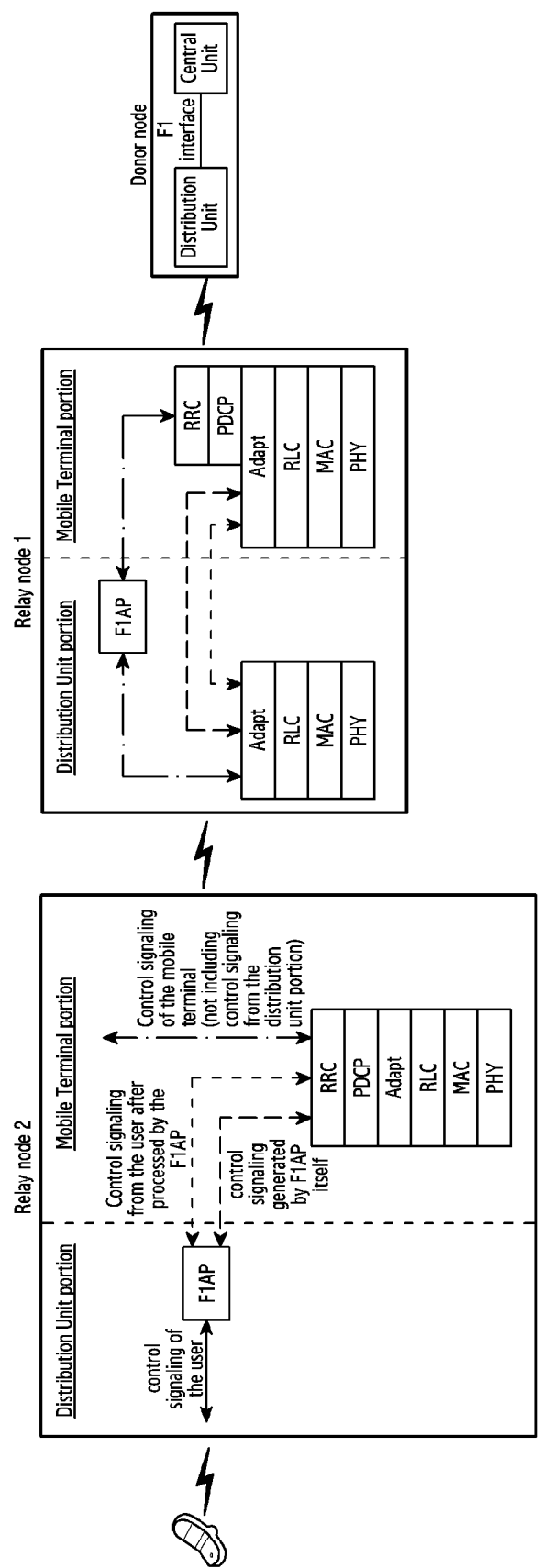
FIG. 2 illustrates a schematic diagram of transmissions of control signaling in the relay network.

FIG. 2 illustrates a schematic diagram in which the control signaling is processed inside a relay node and is transmitted between a relay node and a donor node, in the IAB network according to an embodiment of the present application. As shown in FIG. 2, each of the relay nodes will transmit the control signaling to the central unit of the donor node. For instance, relay node 2 will transmit the control signaling to the donor node through the mobile terminal portion, or relay node 2 receives the control signaling transmitted by the donor node through the mobile terminal portion. According to various embodiments, the relay node can be referred as 'IAB node' or 'IAB-donor node'.

The control signaling of the relay node includes the control signaling generated by the distribution unit and the control signaling generated by the mobile terminal. The control signaling generated by the distribution unit may refer to an F1AP message defined by the 3GPP TS 38.473 protocol. The F1AP message defined in that protocol may be the control signaling including the user who accesses the distribution unit of relay node 2 (see "control signaling from the user after processed by the F1AP" in FIG. 2). The control signaling is obtained after the control signaling from the user is processed via the F1AP, that is, the control signaling is generated by placing the control signaling from the user in the F1AP message. The control signaling generated by the distribution unit may also be the ones generated by the distribution unit itself (see "control signaling generated by F1AP itself" in FIG. 2). The control signaling generated by the mobile terminal is the control signaling that does not include the F1AP message. Such control signaling will be transmitted outward after being processed via the protocol stack RRC/PDCP/Adapt/RLC/MAC/PHY of the mobile terminal portion, or is obtained after being processed via these protocol layers, among which the RRC protocol layer is an optional protocol layer. An Adapt protocol layer is also an optional protocol layer, which can be located between the PDCP and RLC layers, or between the RLC and the MAC layers, and it mainly aids each of the relay nodes to route each data packet.

With regard to the uplink (the control signaling is transmitted from relay node 2 to relay node 1), the control signaling generated by the mobile terminal portion of relay node 2 (i.e., the control signaling from the distribution unit portion of relay node 2 is not included) will be processed via the F1AP of the distribution unit of relay node 1 after the control signaling transmitted by relay node 2 is received by relay node 1, and then handed over to the mobile terminal portion of relay node 1 for transmissions. The control signaling generated by the distribution unit portion of relay node 2 will be directly transmitted through the mobile terminal portion of relay node 1. With regard to the downlink (the control signaling is transmitted from relay node 1 to relay node 2), the control signaling with respect to the mobile terminal of relay node 2 received by relay node 1 from other nodes (this signaling does not need to be processed by the distribution unit of relay node 2) will be transmitted to the mobile terminal portion of relay node 2 after being processed via the F1AP of the distribution unit of relay node 1. The control signaling with respect to the distribution unit of relay node 2 will be directly transmitted from the distribution unit portion of relay node 1 to the mobile terminal of relay node 2 after being received by the mobile terminal portion of relay node 1, and will be processed via the F1AP of the distribution unit of relay node 2. It can be seen that there are two types of control signaling being transmitted between two relay nodes (relay node 1 and relay node 2), which are respectively the control signaling that does not need to be reprocessed via the F1AP of the distribution unit portion of the relay node, and the control signaling that needs to be processed via the F1 AP of the distribution unit portion of the relay node.

With regard to the control signaling that does not need to be reprocessed via the F1AP of the distribution unit portion of the relay node, the signaling contains an F1AP message, and the signaling may be an RRC message containing an F1AP message, or an F1AP message, or a PDU (such as a PDCP PDU or an RLC PDU) of an RRC message containing an F1AP message, or a PDU (such as a PDCP PDU or an RLC PDU, etc.) containing an F1AP message. As described above, with regard to the uplink, the control signaling generated by the distribution unit of relay node 2 does not need to be processed via the F1AP of the distribution unit of relay node 1; with regard to the downlink, the control signaling transmitted to the distribution unit of relay node 2 does not need to be processed via the F1AP of the distribution unit of relay node 1. Such messages may be referred to as the F1AP of the mobile terminal or the F1AP of the distribution unit. For ease of explaining, MT's F1AP will be used to indicate the message generated by the F1AP of the distribution unit of the relay node, in the description of the present specification, but this is not a limitation to the present application.

With regard to the control signaling that need to be processed via the F1AP of the distribution unit portion of the relay node, the signaling contains an RRC message, and the RRC message does not contain the F1AP message. The signaling may be an RRC message, or a PDU (such as a PDCP PDU or an RLC PDU) containing an RRC message. As described above, with regard to the uplink, the control signaling generated by the mobile terminal of relay node 2 (not including the F1AP message generated by the distribution unit portion) need to be processed via the F1AP of the distribution unit of relay node 1; with regard to the downlink, the control signaling transmitted to the mobile terminal portion of relay node 2 (the signaling does not need to be processed by the distribution unit of relay node 2) need to be processed via the F1AP of the distribution unit of relay node 1. For ease of explaining, MT's RRC will be used to indicate the RRC message that does not contain the F1AP message, in the description of the present specification, but this is not a limitation to the present application.

The transmission of the control signaling is carried by a signaling radio bearer (SRB). The control signaling on the SRB will be transmitted or received after being processed via the PDCP/RLC/MAC/PHY. With respect to a kind of SRB of each user, a PDCP entity, an RLC entity, a logical channel, and a corresponding MAC layer and PHY layer will be configured on the user side. Correspondingly, the PDCP entity, the RLC entity, the logical channel, and the corresponding MAC layer and PHY layer will also be configured on the network side. The currently defined SRBs include SRB0, SRB1/1s, SRB2/2s, and SRB3.

Each type for SRB can be defined as the following:
SRB0 is for radio resource control (RRC) messages using the common control channel (CCCH) logical channel;
SRB1 is for RRC messages (which may include a piggybacked non-access stratum (NAS) message) as well as for NAS messages prior to the establishment of SRB2, all using dedicated control channel (DCCH) logical channel;
SRB2 is for NAS messages, all using DCCH logical channel. SRB2 has a lower priority than SRB1 and may be configured by the network after AS security activation;
SRB3 is for specific RRC messages when UE is in (NG)EN-DC or NR-DC, all using DCCH logical channel.

Split SRB is supported for all the MR-DC options in both SRB1 and SRB2 (split SRB is not supported for SRB0 and SRB3). The split SRB in SRB1 is referred as SRB1s or SRB1-split. The split SRB in SRB2 is referred as SRB2s or SRB2-split. For more detailed descriptions of SRB, please refer to "Section 4.2.2." in TS 3GPP 38.331.

Figure 3A:
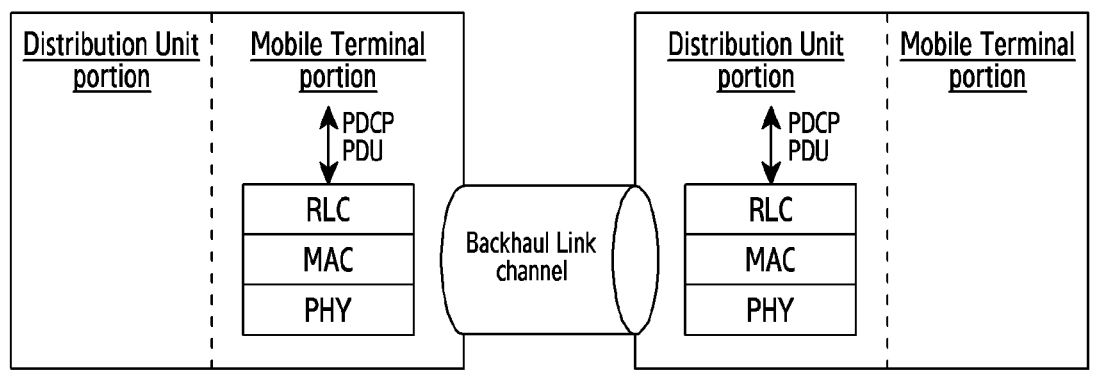
FIGS. 3A and 3B illustrate schematic diagrams of Backhaul Link channels.
Figure 3B:
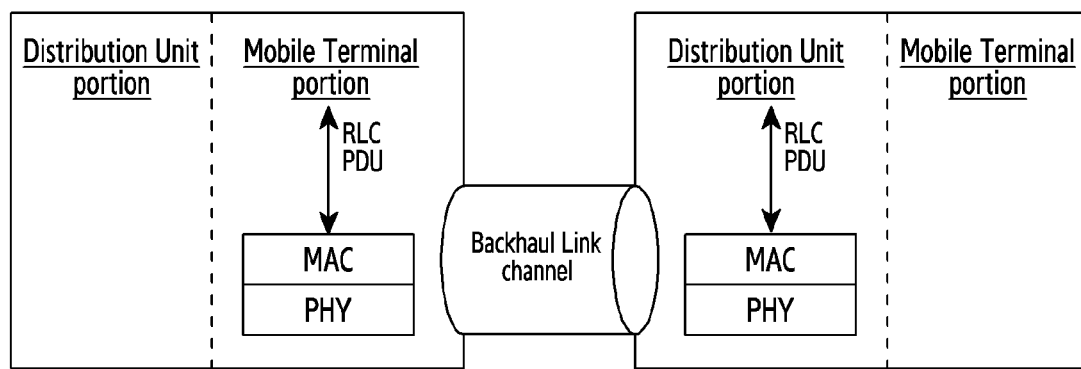

In the relay network, an SRB is also defined between two relay nodes, and a special channel, that is, the Backhaul Link channel, which can be used to carry a data packet processed via the PDCP layer (such as a PDCP PDU), is also defined, as shown in FIG. 3A; or the channel can be used to carry a data packet processed via the RLC layer (RLC PDU), as shown in FIG. 3B. In case of FIG. 3B, the backhaul link channel is a RLC channel and can be referred as 'backhaul RLC channel' in IAB network.

The Backhaul Link channel has a corresponding logical channel. In the relay network, MT's F1AP and MT's RRC will be transmitted over the Backhaul Link channel between the relay nodes, and finally to the central unit of the donor node, or finally to the relay node from the central unit of the donor node.

In the prior art, the transmissions of MT's F1AP and MT's RRC over the Backhaul Link channel have not been considered, and how MT's F1AP is carried in the SRB has not been considered either. The embodiments of the present application are directed to these problems, and propose a method for transmitting MT's F1AP and MT's RRC between the relay nodes. According to the present application, interactions of user related context between the central unit and the distribution unit of a base station, as well as between the relay nodes can be implemented.

Figure 4:
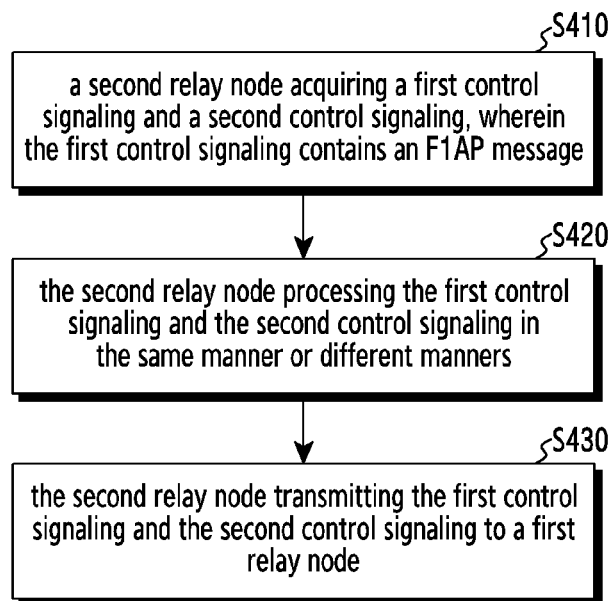
FIG. 4 illustrates a flow chart of a method for transmitting the control signaling in the relay network according to an embodiment of the present application.

FIG. 4 illustrates a flowchart of a method for transmitting the control signaling in the relay network according to an embodiment of the present application. As shown, a method for transmitting the control signaling in the relay network mainly includes:

Step S410: A second relay node acquires a first control signaling and a second control signaling, wherein the first control signaling includes an F1AP message.

Step S420: The second relay node processes the first control signaling and the second control signaling in the same or different manners.

Step S430: The second relay node transmits the first control signaling and the second control signaling to a first relay node.

Although FIG. 4 describes that the second relay node acquires second control signaling with the first control signaling, but it is used only for convenience of description to compare two control signaling. Therefore, the present disclosure is not limited by the operations described below, and other terms having equivalent technical meanings may be used. In some embodiments, the second relay node the second control signaling can be omitted. The second relay node can each control signaling independently.

FIGS. 5A to 5D respectively illustrates schematic diagrams of the method for transmitting the control signaling in the relay network according to an embodiment of the present application. Hereinafter, based on the relay network example shown in FIG. 1, taking the F1AP generated by the distribution unit of relay node 2 and the RRC message of the mobile terminal portion of relay node 2 are transmitted between the mobile terminal portion of relay node 2 and the distribution unit of relay node 1, that is, MT's F1AP and MT's RRC of relay node 2, as an example, specific embodiments of the transmission procedures of the control signaling described above are explained in detail.

Prior to explanations, it should be noted that the F1AP messages contained in MT's F1AP at a relay node include:
1) The F1AP containing the RRC message of the user served by the distribution unit portion of the relay node, and this contained RRC message may be carried on SRB0/1/1s/2/2s/3 by the user.
2) The F1AP message that is related to the user served by the distribution unit portion of the relay node (UE-associated F1AP), and this message does not contain or contains the RRC message of the user.
3) The F1AP message that is unrelated to the user served by the distribution unit portion of the relay node (non-UE-associated F1AP).

F1AP provides the signaling service between gNB-DU and the gNB-CU that is required to fulfil the F1AP functions (e.g., described in clause 7 in 3GPP TS 38.473). F1AP services can be divided into two groups:
Non UE-associated services: They are related to the whole F1 interface instance between the gNB-DU and gNB-CU utilizing a non UE-associated signalling connection.
UE-associated services: They are related to one UE. F1AP functions that provide these services are associated with a UE-associated signalling connection that is maintained for the UE in question.

The mobile terminal of a relay node may transmit the F1AP generated by the distribution unit of the relay node in the same manner, that is, all MT's F1APs are transmitted in the same manner (as assumed in various embodiments described above). The F1AP messages described above may also be classified, such as F1AP message type 1, F1AP message type 2, etc. Different types of F1AP messages may be transmitted in different manners, and may be also in the same manner.

Classification methods for MT's F1AP are as follows: one classification method example is to classify according to the transmission manner of MT's F1AP. The F1AP messages using the same transmission manner (such as the same SRB bearer, the same Backhaul Link channel bearer, the same logical channel transmission, the processing by one or more same protocol entities (such as the PDCP protocol entity, the RLC protocol entity, the MAC protocol entity, the PHY protocol entity) are the same type of message; another classification method example is to classify according to content. Existing F1AP messages can be classified into types as follows:
non-UE-associated F1AP message
UE-associated F1AP message that does not contain the RRC message
F1AP that contains the RRC message carried by the SRB0
F1AP that contains the RRC message carried by the SRB1
F1AP that contains the RRC message carried by the SRB2
F1AP that contains the RRC message carried by the SRB3

When F1AP messages are classified according to content, one or more types of F1AP messages above may be used as one type. For instance, one possible classification method is: all UE-associated F1AP messages are of F1AP message type 1, and all non-UE-associated F1AP messages are of F1AP message type 2; another possible classification method is: all F1 APs that contain the RRC message carried by the SRB0 are of F1 AP message type 1, and all F1APs that contain the RRC message carried by the SRB1 are of F1AP message type 2, all UE-associated F1AP messages that do not contain the RRC message are of F1AP message type 4, and all F1AP messages that contain non-UE-associated F1AP messages are of F1AP message type 5; another classification method is: F1APs that contain the RRC message carried by the SRB0 are of F1AP message type 1, F1APs that contain the RRC message carried by the SRB1 and the SRB3 are of F1AP message type 2, F1APs that contain the RRC message carried by the SRB2 are of F1AP message type 3, all UE-associated F1AP messages that do not contain the RRC message are of F1AP message type 4, and all F1AP messages that contain non-UE-associated F1AP messages are of F1AP message type 5. The present application does not limit other possible classification methods, as well as other types of MT's F1AP. As described above, the message type can be defined according to at least one of whether F1AP service is a UE-associated service or a non UE-associated services, whether the message contains RRC or not, a SRB type for the message. Two or more limitations may be considered together, so that one type for a message may be defined.

In the descriptions below, MT's F1AP may include one or more types, and MT's RRC may also include one or more types (MT's RRC carried by different existing SRBs, such as SRB0/1/1s/2/2s/3, may be considered as different types). If there is only one type, it means that all MT's F1APs fall into one type. If there is only one type of MT's RRC, it means that all MT's RRCs are classified into one type.

Figure 5A:
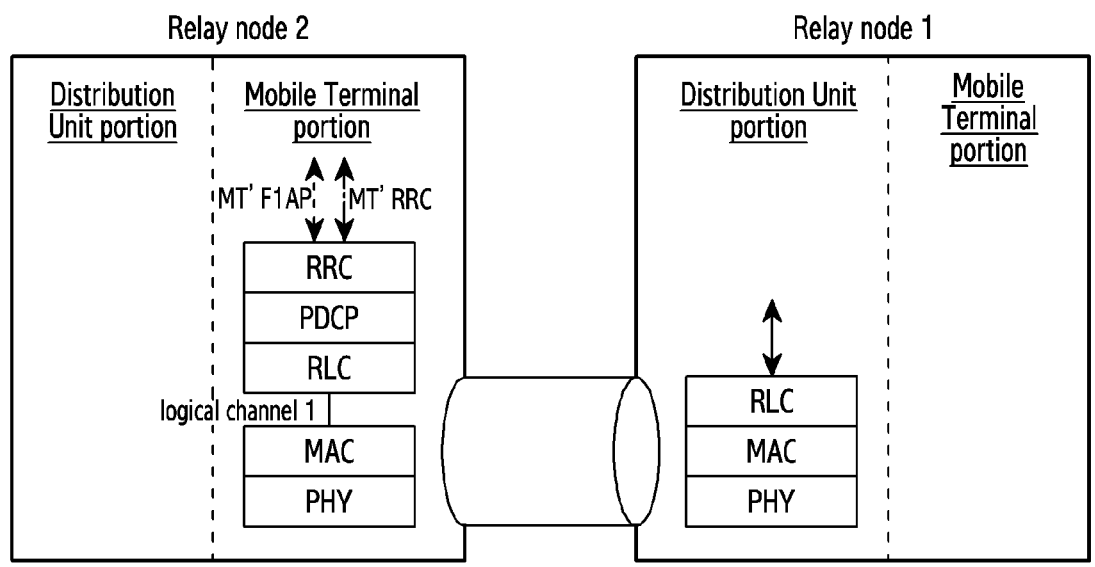
FIGS. 5A to 5D respectively illustrates a schematic diagram of the method for transmitting the control signaling in the relay network according to an embodiment of the present application.

Example 1: One or more types of MT's F1AP and one or more types of MT's RRC use the same SRB bearer, or one or more types of messages in MT's F1AP and another one or more types of messages in MT's F1AP use the same SRB bearer. As shown in FIG. 5A, taking one type of MT's F1AP and one type of MT's RRC using the same SRB bearer as an example (when considering that one or more types of messages in MT's F1AP and another one or more types of messages in MT's F1AP use the same SRB bearer, the "MT's RRC" in the following descriptions may be replaced with "another type of message of MT's F1AP"), that is, MT's F1AP and MT's RRC are processed over the same PDCP/RLC and logical channel, and the SRB is an existing SRB, such as one of SRB0/1/2/2s/3 or a new-defined SRB; in order to distinguish these two types of messages, the method is to add an Adapt layer on top of the RLC entity or the MAC entity. One of the effects of the Adapt layer is to add or read indication information in a data packet, which indicates whether MT's F1AP or MT's RRC is included in the data packet. In addition, the indication information can also be added within the MAC header, such that there is no need to add an Adapt layer.

In a specific embodiment, that indication information is the indication information on the type of the data packet, for instance, "1" represents that the data packet is one containing MT's F1AP, and "0" represents that the data packet is one containing MT's RRC.

In another specific embodiment, with regard to the packet of MT's F1AP, the identification information of the relay node (such as an ID of the relay node, an ID of the distribution unit of the relay node, and an ID of the mobile terminal of the relay node, etc.) will be added by the protocol layer; with regard to the packet of MT's RRC, predefined information (such as all "0", or all "1") will be added by the protocol layer.

In still another specific embodiment, distinguishment is performed by adding identification information. In one embodiment, that identification information indicates the identification information of the node at which the distribution unit processing the data packet is located. For instance, with regard to the packet of MT's F1AP, the identification information of relay node 2 (such as an ID of the relay node, an ID of the distribution unit of the relay node, an ID of the mobile terminal of the relay node, and an identification of the cell to which the mobile terminal portion of the relay node accesses, etc.) is added; with regard to the packet of MT's RRC, the identification information of relay node 1 (such as an ID of the relay node, an ID of the distribution unit of the relay node, an ID of the mobile terminal of the relay node, and an identification of the cell to which the mobile terminal portion of the relay node accesses, etc.) is added. In such implementation, the donor node or relay node 1 will transmit the identification information of relay node 1 to relay node 2. In this embodiment, if the data packet received by a relay node, including control signaling, contains the identification information of the relay node, the relay node will transfer the data packet to the distribution unit thereof for processing.

In another embodiment (in this embodiment, it is not required to distinguish between MT's F1AP and MT's RRC), that identification information indicates the identification information of the node at which the data packet including control signaling terminates (Terminated node). The "the node at which the data packet terminates" indicates the identification information of the RRC entity and/or the F1AP entity processing the data packet. That is, only after the data packet is received by the relay node indicated by the identification information, the data packet can be processed by the RRC layer of the mobile terminal of the relay node, or processed by the distribution unit of the relay node, or processed by both the mobile terminal and the distribution unit of the relay node. Then the data packet will not be transmitted to other nodes. However, part of the control signaling obtained after the data packet is processed can be transmitted to other nodes. For instance, with regard to MT's RRC of relay node 2, that identification information is the identification information of relay node 2, with regard to MT's F1AP of relay node 2, that identification information is the identification information of relay node 2. The data packet with the identification information will be handed over to the RRC and/or the F1 AP only when it is received by relay node 2, other relay nodes only forward the data packet otherwise. In such implementation, MT's F1AP and MT's RRC are transmitted using the same SRB, as well as processed in the same manner, such that the relay node receiving MT's F1AP and MT's RRC does not need to process the two types of information in different manners. For instance, with regard to the uplink, the mobile terminal of relay node 2 transmits MT's F1AP and MT's RRC to relay node 1, and the identification information of relay node 2 will be added for such two control signaling. In this way, MT's RRC will not be handed over to the distribution unit of relay node 1 for processing after it is received by relay node 1. With regard to the downlink, relay node 1 does not need to hand MT's RRC over to the distribution unit for processing and then transmit it to relay node 2, due to the data packet carries the identification information of relay node 2, after relay node 1 received MT's RRC and MT's F1AP of relay node 2.

Figure 5B:
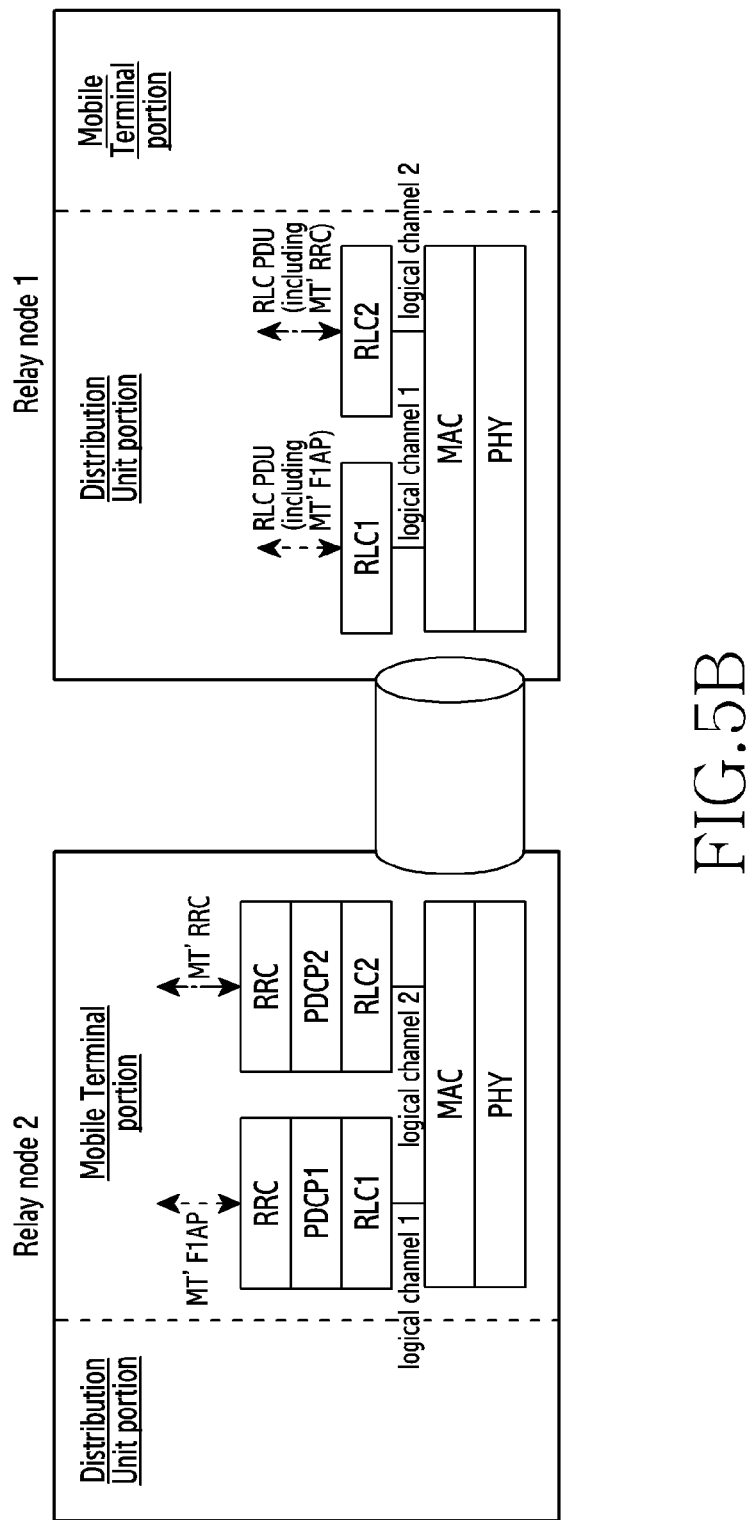

Example 2: One or more types of MT's F1AP and one or more types of MT's RRC use different SRB bearers, or one or more types of messages in MT's F1 AP and another one or more types of messages in MT's F1AP use different SRB bearers. As shown in FIG. 5B, taking one type of MT's F1AP and one type of MT's RRC using different SRB bearers as an example (when considering that one or more types of messages in MT's F1AP and another one or more types of messages in MT's F1AP use different SRB bearers, the "MT's RRC" in the following descriptions may be replaced with "another type of message of MT's F1AP"). For instance, the SRB used to carry MT's F1AP is SRB_x (corresponding to PDCP1/RLC1 and logical channel 1), and the SRB used to carry MT's RRC is SRB_y (SRB_y is an existing SRB, such as SRB0/1/2/2s/3/3s, or a new-defined SRB, corresponding to PDCP2/RLC2 and logical channel 2). The advantage of this method is: with regard to the uplink, relay node 1 can determine whether MT's F1AP or MT's RRC is contained according to the data packets outputted through different RLC entities. If it is the MT's RRC that is contained, relay node 1 will process it through the distribution unit of relay node 1, and if it is the MT's F1AP that is contained, relay node 1 will directly hand it over to the mobile terminal portion of relay node 1 for transmitting.

A specific implementation of example 2 described above is: SRB_x is a new-defined SRB. Since MT's RRC is carried using an existing SRB, MT's F1AP can be naturally distinguished from MT's RRC.

Another specific implementation of example 2 described above is: SRB_x is an existing SRB, such as MT's RRC is carried using SRB1, and MT's F1AP is carried using SRB2. When configured, the SRB2 can be indicated to carry MT's F1AP only.

A further specific implementation of example 2 described above is: SRB_x and SRB_y are different SRBs and both of them are newly defined, then MT's F1AP can be naturally distinguished from MT's RRC.

A further specific implementation of example 2 described above is: both SRB_x and SRB_y are existing SRBs, such as MT's RRC is carried using SRB1, and MT's F1AP is carried using SRB2. When configured, the SRB2 can be indicated to carry MT's F1AP only.

In addition, MT's F1AP described above may be included in one or more RRC messages as an Information Element (IE), and the RRC messages may be one or more new-defined RRC messages (such as F1AP MessageTransfer), or may be one or more existing RRC messages (such as RRCReconfiguration, ULInformationTransfer, DLInformationTransfer, etc., see 3GPP TS 38.331). When MT's F1AP is included in one or more existing RRC messages, if the RRC messages contain MT's F1AP, MT's F1AP will be transmitted on SRB_x, and if not, it will be transmitted on SRB_y.

Figure 5C:
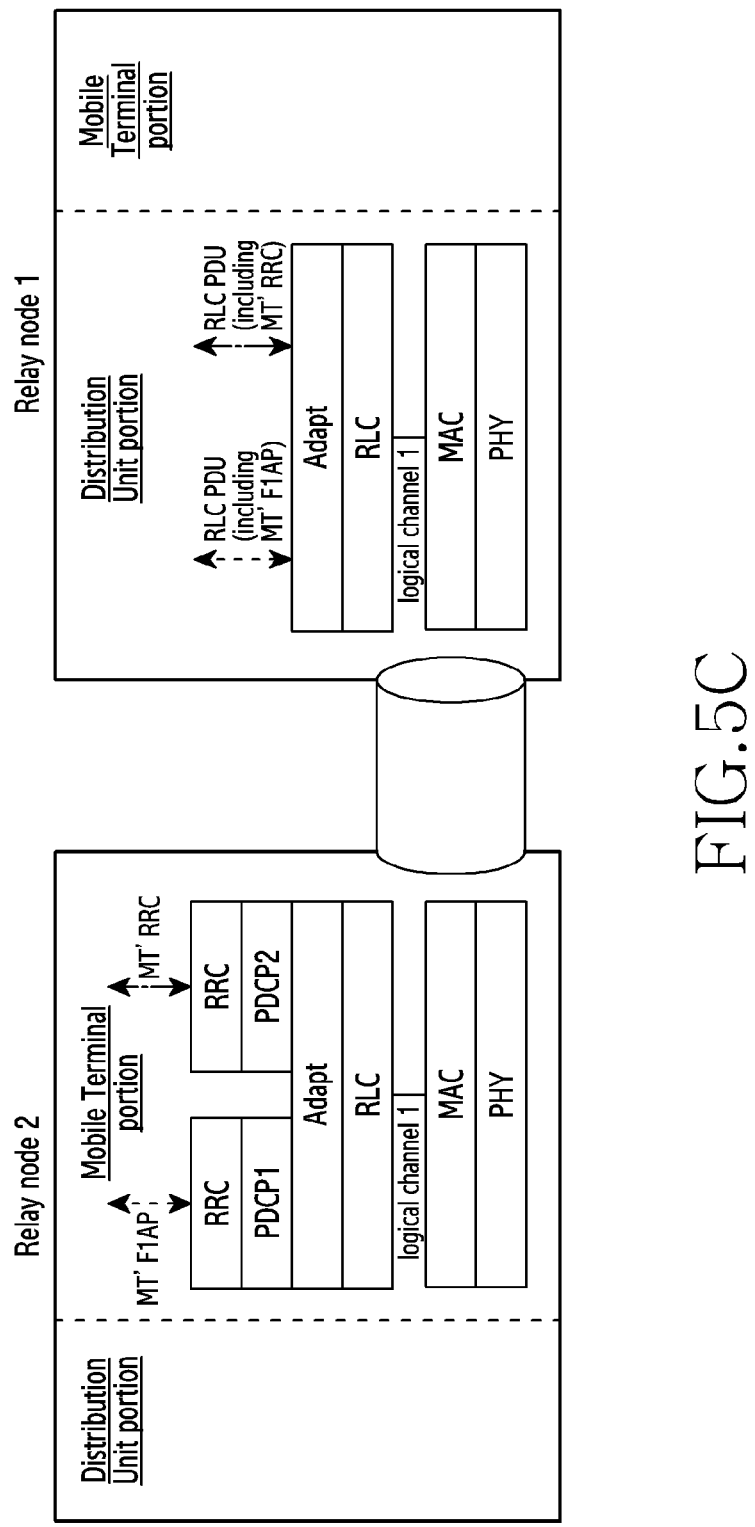
Figure 5D:
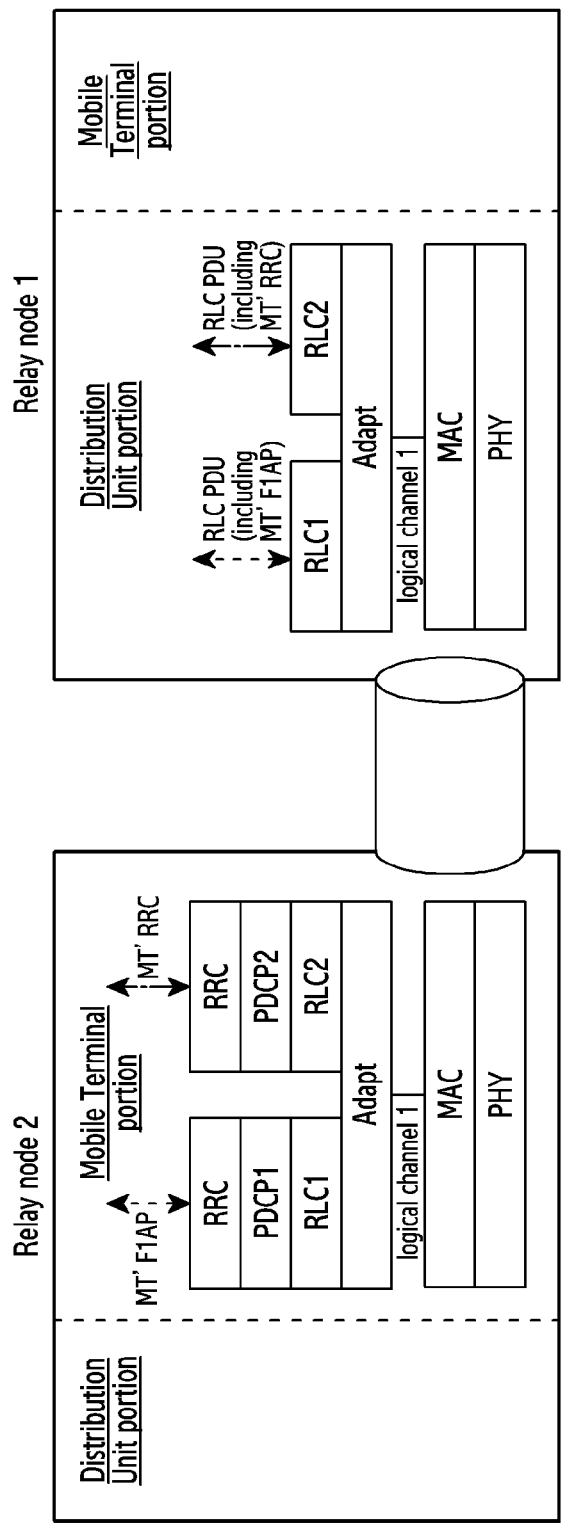

Example 3: One or more types of MT's F1AP share the same Backhaul Link channel as one or more types of MT's RRC, or one or more types of messages in MT's F1AP share the same Backhaul Link channel as another one or more types of messages in MT's F1AP. Taking one type of MT's F1AP shares the same Backhaul Link channel as one type of MT's RRC as an example (when considering that one or more types of messages in MT's F1AP share the same Backhaul Link channel as another one or more types of messages in MT's F1AP, the "MT's RRC" in the following descriptions may be replaced with "another type of message of MT's F1AP"). For instance, the same RLC entity and logic channel but different PDCP entities are used, as shown in FIG. 5C; or the same logical channel but different PDCP entities and RLC entities are used, as shown in FIG. 5D. The advantage of this method is also in that it can distinguish between MT's F1AP and MT's RRC, such that relay node 1 can perform different processing on the two types of control information. One possible processing is that MT's RRC will be processed via the F1AP of the distribution unit portion of relay node 1, while MT's F1AP will not.

Referring to FIG. 5C, both MT's F1AP and MT's RRC are processed via the same RLC entity, and are transferred between the RLC entity and the MAC entity over the same logical channel (the logical channel between the RLC entity and the MAC entity). However, the PDCP entity used by MT's F1AP is PDCP1, and the PDCP entity used by MT's RRC is PDCP2. To distinguish between the two types of control signaling, an Adapt layer is added on top of the RLC entity. One of the effects of the Adapt layer is to add or read the indication information in a data packet, regarding indicating the distinguishment between MT's F1AP and MT's RRC, or the indication information of the node processing the data packet. The indication information indicates that whether the node having received the data packet needs to perform RRC layer processing and/or F1AP processing on the data packet.

In a specific embodiment, that indication information may be the indication information indicating the type of the data packet. For instance, "1" indicates that the data packet is a data packet containing MT's F1AP, and "0" indicates that the data packet is a data packet containing MT's RRC.

In another specific embodiment, with regard to the data packet containing MT's F1AP, the adaptation protocol layer will add the identification information of the relay node (such as an ID of the relay node, an ID of the distribution unit of the relay node, an ID of the mobile terminal of the relay node, and an identification of the cell to which the mobile terminal portion of the relay node accesses, etc.) into the data packet; with regard to the data packet containing MT's RRC, the adaptation protocol layer will add predefined information into the data packet (such as all "0" or all "1").

In yet another specific embodiment, distinguishment is performed by adding different identification information. In one embodiment, that identification information indicates the identification information of the node at which the distribution unit processing the data packet is located. For instance, with regard to the packet of MT's F1AP, the identification information of relay node 2 (such as an ID of the relay node, an ID of the distribution unit of the relay node, an ID of the mobile terminal of the relay node, and an identification of the cell to which the mobile terminal portion of the relay node accesses, etc.) is added; with regard to the packet of MT's RRC, the identification information of relay node 1 (such as an ID of the relay node, an ID of the distribution unit of the relay node, an ID of the mobile terminal of the relay node, and an identification of the cell to which the mobile terminal portion of the relay node accesses, etc.) is added. In such implementation, the donor node or relay node 1 will transmit the identification information of relay node 1 to relay node 2. In this embodiment, if the data packet received by a relay node, including control signaling, contains the identification information of the relay node, the relay node will transfer the data packet to the distribution unit thereof for processing.

In another embodiment (in this embodiment, it is not required to distinguish between MT's F1AP and MT's RRC), that identification information indicates the identification information of the node at which the data packet including control signaling terminates (Terminated node). The "the node at which the data packet terminates" indicates the identification information of the RRC entity and/or the F1AP entity processing the data packet. That is, only after the data packet is received by the relay node indicated by the identification information, the data packet can be processed by the RRC layer of the mobile terminal of the relay node, or processed by the distribution unit of the relay node, or processed by both the mobile terminal and the distribution unit of the relay node. Then the data packet will not be transmitted to other nodes. However, part of the control signaling obtained after the data packet is processed can be transmitted to other nodes. For instance, with regard to MT's RRC of relay node 2, that identification information is the identification information of relay node 2; with regard to MT's F1AP of relay node 2, that identification information is the identification information of relay node 2. The data packet with the identification information will be handed over to the RRC and/or the F1AP only when it is received by relay node 2, other relay nodes only forward the data packet otherwise. In such implementation, MT's F1AP and MT's RRC are transmitted using the same SRB, as well as processed in the same manner, such that the relay node receiving MT's F1AP and MT's RRC does not need to process the two types of information in different manners. For instance, with regard to the uplink, the mobile terminal of relay node 2 transmits MT's F1AP and MT's RRC to relay node 1, and the identification information of relay node 2 will be added for such two control signaling. In this way, MT's RRC will not be handed over to the distribution unit of relay node 1 for processing after it is received by relay node 1. With regard to the downlink, relay node 1 does not need to hand MT's RRC over to the distribution unit for processing and then transmit it to relay node 2, due to the data packet carries the identification information of relay node 2, after relay node 1 received MT's RRC and MT's F1 AP of relay node 2.

Referring to FIG. 5C, the transfer of the data packet is as follows:

with regard to the uplink, the Adapt layer of the mobile terminal portion of relay node 2 adds the indication information indicating the type of the data packet described above for the data packets from PDCP1 and PDCP2, and then hands them over to the same RLC entity for processing. The data packets are transferred to the MAC entity over the same logical channel, and finally to the distribution unit portion of relay node 1. At relay node 1, the data packets from relay node 2 will be processed through the distribution unit of relay node 1. The Adapt layer of the distribution unit will read the information in the data packet from the RLC entity, and determines whether it is MT's F1AP or MT's RRC that is contained in the data packet according to the information. If MT's RRC is contained, the packet needs to be processed via the F1AP of the distribution unit of relay node 1 and then transmitted through the mobile terminal portion of relay node 1, and if not, the packet may be directly handed over to the mobile terminal portion of relay node 1 for processing and transmitting.

With regard to the downlink, the Adapt layer of the distribution unit portion of relay node 1 will add different indication information for the data packet containing MT's F1AP and the data packet containing MT's RRC respectively, and then hands them over to the same RLC entity for processing. The data packets are transferred to the MAC entity over the same logical channel, and finally to the mobile terminal portion of relay node 2. The protocol layer of the mobile terminal portion of relay node 2 will read the information in the data packet from the RLC entity, which can indicate whether the data packet from the RLC entity is a packet containing MT's F1AP or a packet containing MT's RRC. If it is a packet containing MT's F1AP, the packet will be transferred to the PDCP entity (i.e. PDCP1) serving MT's F1AP after processed via the Adapt layer (such as removing the packet header information related to the Adapt layer in the data packet).

The embodiment in FIG. 5D is similar to FIG. 5C except that the Adapt layer is located between the RLC layer and the MAC layer. With regard to the uplink, the mobile terminal portion of relay node 2 adds the indication information described above for the data packets from different RLC entities, and with regard to the downlink, the mobile terminal portion of relay node 2 reads information in the data packet from the same logical channel and transfers the data packet to different RLC entities according to the difference between the indication information above.

Figure 6:
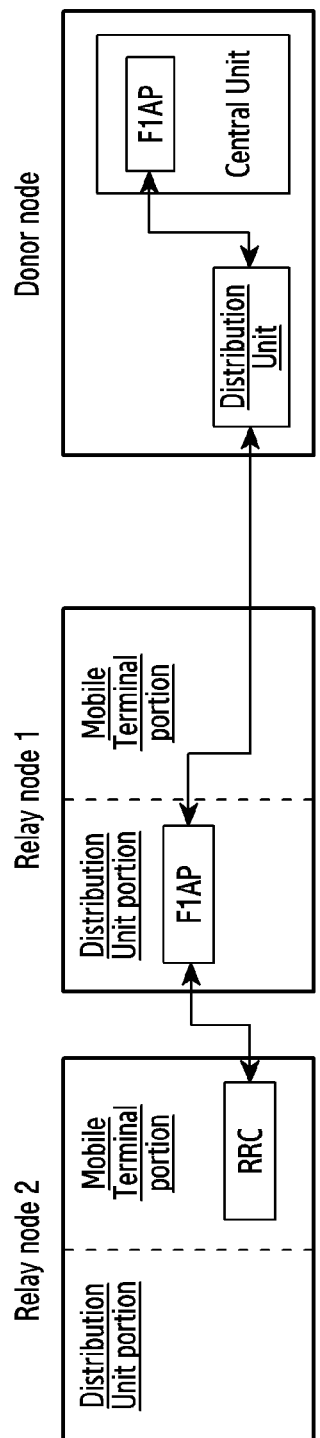
FIG. 6 illustrates a schematic diagram of entities involved in a configuration method used for transmissions of control signaling in the relay network according to an embodiment of the present application.
Figure 7:
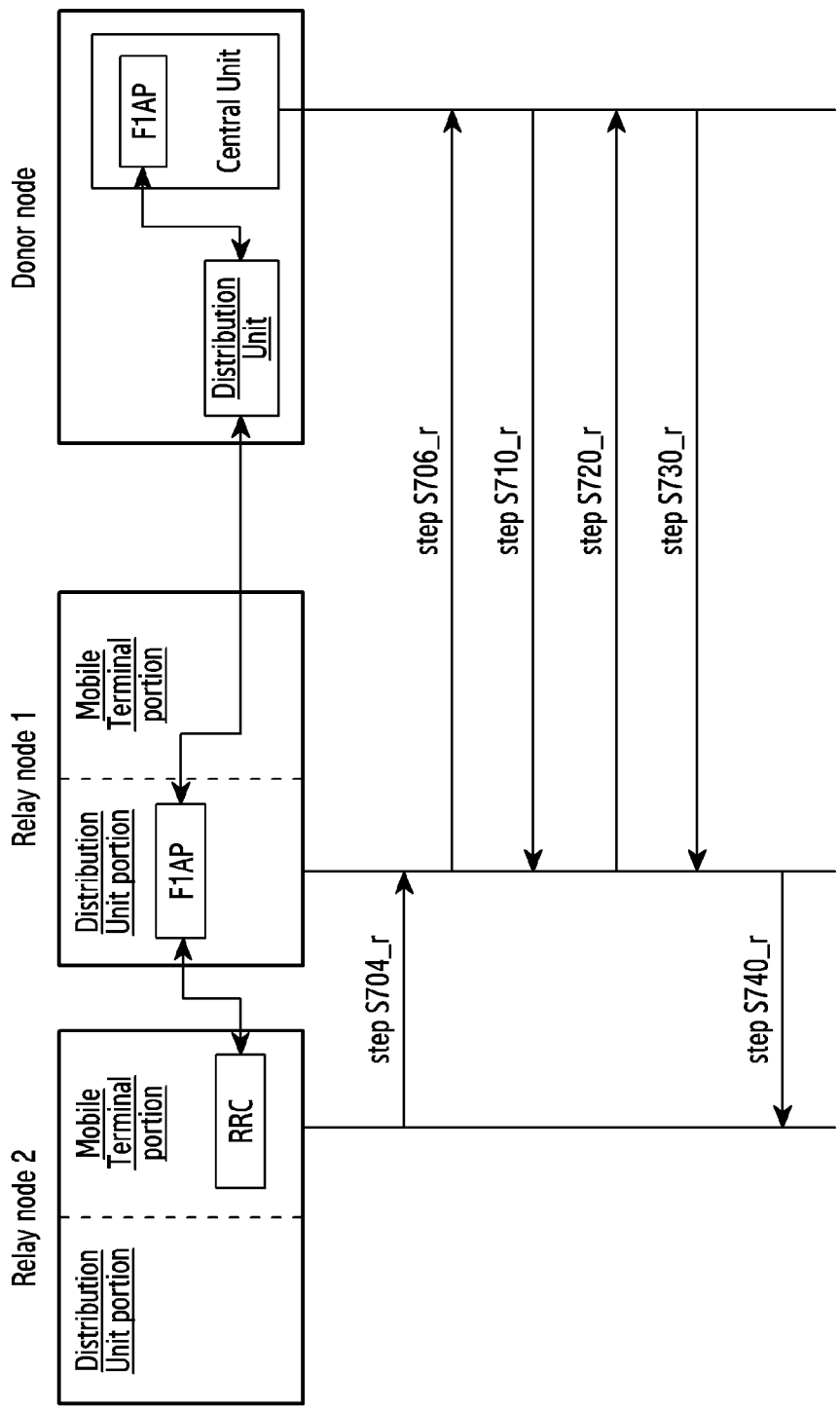
FIG. 7 illustrates a flow chart of a configuration method used for transmissions of control signaling in the relay network according to an embodiment of the present application.

In order to implement the transmissions of MT's F1AP and MT's RRC between the relay nodes in the IAB network, it is required to configure the mobile terminal portion of the relay node. Therefore, in accordance with another aspect of the present application, a method of configuring a relay node through a donor node is provided. The entities involved in the configuration procedure are shown in FIG. 6. The transmissions of the configuration information in the configuration procedure are shown in FIG. 7.

FIG. 6 illustrates three nodes, namely relay node 2, relay node 1, and a donor node. The donor node includes a distribution unit and a central unit, and the distribution unit and the central unit are connected by wired lines, it is an F1 interface there, including F1-C and F1-U. The distribution unit of the donor node communicates with relay node 1 via a wireless link. They may communicate directly or communicate through one or more other relay nodes. Relay node 1 and relay node 2 are directly connected and communicate via a wireless link. The configuration procedure is implemented by: performing configuration messages interaction between the central unit of the donor node and the distribution unit of relay node 1 (in the interaction procedure, the configuration messages will be transmitted between the central unit of the donor node and the distribution unit of the relay node directly or by being forwarded through one or more entities), and then sending the generated configuration messages from the donor node to the mobile terminal portion of relay node 2 after being forwarded through one or more entities.

In FIG. 6, the Relay node 2 correspond to IAB-node 2, the Relay node 1 correspond to IAB-node 1, the donor node correspond to IAB-donor node including DU ad CU. Referring to FIG. 6, the present disclosure describes some procedures of backhaul link channel establishment. The backhaul link channel can be referred as the backhaul RLC channel, as described above. The backhaul RLC channel is an RLC channel used for backhauling between IAB-node and IAB-donor-DU, or between different IAB-nodes.

Hereinafter, in assuming that IAB network shown in the FIG. 6, the exemplary operations are described. However, operations described below are described by way of example in order to facilitate understanding of LAB nodes, and should not be construed as limiting the embodiments of the present disclosure.

1. First, UE, IAB node 1, IAB node 2, and IAB-donor node perform UE initial access procedure. The TAB-node 2 is configured with information to set up the access DRB.

2. IAB-donor-CU sends to the IAB-donor-DU an F1-AP request message for setting up the parent DU side of the BH link between IAB-donor DU and IAB-node 1. This step is optional and is required when a new BH RLC channel needs to be established on the BH link between IAB-donor-DU and TAB-node 1.

3. IAB-donor-DU responds to the F1-AP request message from the IAB-donor-CU from step 2.

4. IAB-donor-CU sends to the IAB-donor-DU an DL RRC MESSAGE TRANSFER message encapsulating the RRC Reconfiguration message for configuring the MT functionality of the IAB-node 1. This step is optional and is required when a new BH RLC channel needs to be established on the BH link between IAB-donor-DU and IAB-node 1.

5. The IAB-donor-DU decapsulates and forwards the RRC Reconfiguration message to the MT functionality of the IAB-node 1. This step is optional and is required when a new BH RLC channel needs to be established on the BH link between IAB-donor-DU and IAB-node 1.

6. The MT functionality of the IAB-node 1 sends to the IAB-donor-DU an RRC Reconfiguration Complete message destined to the IAB-donor-CU. This step is optional and is required when a new BH RLC channel needs to be established on the BH link between IAB-donor-DU and IAB-node 1.

7. The IAB-donor-DU sends the UL RRC MESSAGE TRANSFER Message encapsulating the RRC Reconfiguration Complete message to the IAB-donor-CU. This step is optional and is required when a new BH RLC channel needs to be established on the BH link between IAB-donor DU and IAB-node 1.

8. IAB-donor-CU sends to the DU functionality of IAB-node 1 an F1-AP request message for setting up the parent DU side of the BH link between IAB-node 1 and IAB-node 2. This step is optional and is required when a new BH RLC channel needs to be established on the BH link between IAB-node 1 and IAB-node 2.

9. IAB-node 1 responds to the F1-AP request message from the IAB-donor-CU from step 8.

10. IAB-donor-CU sends to the DU functionality of IAB-node 1 a DL RRC MESSAGE TRANSFER message encapsulating the RRC Reconfiguration message for configuring the MT functionality of LAB-node 2. This step is optional and is required when a new BH RLC channel needs to be established on the BH link between IAB-node 1 and LAB-node 2.

11. The DU functionality of IAB-node 1 decapsulates and forwards the RRC Reconfiguration message to the MT functionality of the IAB-node 2. This step is optional and is required when a new BH RLC channel needs to be established on the BH link between IAB-node 1 and IAB-node 2.

12. The MT functionality of the IAB-node 2 sends to the IAB-node 1 an RRC Reconfiguration Complete message destined to the IAB-donor-CU. This step is optional and is required when a new BH RLC channel needs to be established on the BH link between IAB-node 1 and IAB-node 2.

13. The IAB-node 1 sends the UL RRC MESSAGE TRANSFER Message encapsulating the RRC Reconfiguration Complete message to the IAB-donor-CU. This step is optional and is required when a new BH RLC channel needs to be established on the BH link between IAB-node 1 and IAB-node 2.

14. IAB-donor-CU sends to the DU functionality of IAB-node 2 an UE context modification request for the UE DRB.

15. The DU functionality of the LAB-node 2 sends the UE context modification response to the IAB-donor-CU.

16. The IAB-Donor CU generates the RRC Reconfiguration message and encapsulates it in the DL RRC MESSAGE TRANSFER message for the DU functionality of IAB-node 2.

17. The DU functionality of the IAB-node 2 sends the RRC Reconfiguration message to the UE.

18. The UE sends RRC Reconfiguration Complete message to the DU functionality of the IAB-node 2.

19. The DU functionality of IAB-node 2 encapsulates the RRC message in the UL RRC MESSAGE TRANSFER message and sends it to IAB-Donor CU.

The IAB-donor-CU uses the existing CU-DU split principles and the F1-AP signaling to configure the parent DU side of the RLC channel. The IAB-donor-CU uses RRC signaling (which is piggybacked in F1-AP messages terminating at the parent DU side of the backhaul RLC channel) to configure the child IAB-node part of the backhaul RLC channel (i.e. the MT functionality of the child node).

Referring to FIG. 7, a configuration method according to an embodiment of the present application includes the following operations. In some embodiments, the purpose of the operations is to establish the UE Context including, among others, SRB, DRB and BH RLC channel configuration. In a such case, the procedure uses UE-associated signalling.

In step S710_r, the first relay node receives a first configuration message from a donor node, wherein the first configuration message is used for configuring transmissions of an F1AP message with a second relay node. The first configuration message may be sent from the central unit of the donor node to the distribution unit of relay node 1. The first configuration message may be a UE context setup request message or a UE context modification request message.

In a specific embodiment, the first configuration message includes at least one of the following information:
1) Identification information of relay node 2, such as the identification information of the mobile terminal of relay node 2.
2) Information of the SRB that is required to be established or modified.

In other embodiments, the information of the SRB that is required to be established or modified includes at least one of the following information:
2.1) SRB identification information, such as an SRB ID.
2.2) Indication information indicating the type of information carried by the SRB. The type of the information carried by the SRB may be one or more of the following types: an RRC message that does not contain the F1AP, an RRC message that contains the F1AP, an F1AP message, an RRC message that contains F1AP message type 1, an F1AP message that contains F1AP message type 1, an RRC message that contains F1AP message type 2, an F1AP message that contains F1AP message type 2, . . . , an RRC message that contains F1AP message type n, and F1AP message that contains F1AP message type n, etc. The indication information may be an SRB ID, identification information of an information type, etc. The indication information may be explicitly information or implicit information (for instance, the type of the information carried by the SRB can be obtained by using the SRB ID).

2.3) Indication information of the type of the information additionally carried, which indicates that the information that the SRB can be able to additionally carry in addition to the information of MT's RRC that is carried by the SRB indicated by the SRB identification information. The type of the information additionally carried may be one or more of the following types: an RRC message that contains the F1AP, an F1AP message, an RRC message that contains F1AP message type 1, an F1AP message that contains F1AP message type 1, an RRC message that contains F1AP message type 2, an F1AP message that contains F1AP message type 2, . . . , an RRC message that contains F1AP message type n, and an F1AP message that contains F1AP message type n, etc.

3) Information of the Backhaul Link channel that is required to be established.

In other embodiments, the information of the Backhaul Link channel that is required to be established includes at least one of the following information:

3.1) Identification information of the Backhaul Link channel.

3.2) Indication information of the type of the information carried over the Backhaul Link channel, such as an RRC message that does not contain the F1AP, an RRC message that contains the F1AP, an F1AP message, an RRC message that contains F1AP message type 1, an F1AP message that contains F1AP message type 1, an RRC message that contains F1AP message type 2, an F1AP message that contains F1AP message type 2, . . . , an RRC message that contains F1AP message type n, and F1AP message that contains F1AP message type n, etc. The indication information may be explicit information or implicit information (for instance, the type of the information carried by the SRB can be obtained by using the SRB ID).

3.3) Identification information of the SRB carried over the Backhaul Link channel, such as an SRB ID.

3.4) Indication information on whether there is an Adapt protocol layer. If there is an Adapt protocol layer, it means that the Adapt protocol layer header is required to be added to the data packet from the upper layer (such as the PDCP layer or the RLC layer), and with regard to the data packet from the lower layer (such as the RLC layer or the MAC layer), it is required to read the content of the Adapt protocol layer and remove the Adapt protocol layer header. Further, the indication information may also indicate that the identification information of the relay node at which the RRC layer and/or the distribution unit processing the data packet is located is added (such as an ID of the relay node, an ID of the distribution unit of the relay node, an ID of the mobile terminal of the relay node, and an identification of the cell to which the mobile terminal portion of the relay node accesses, etc.).

3.5) Indication information of the information contained in the Adapt protocol layer. The indication information contains one of the following information:

3.5.1) Indication information of the types of information contained. For instance, the information contained is indication information of the identification information of the relay node, the information contained is indication information of the identification information of the SRB, the information contained is indication information of the identification information of the logical channel, etc.

3.5.2) The content of the information contained is at least one of the following information: the identification information of the relay node (in one embodiment, the relay node indicated by the identification information is the relay node at which the RRC layer and/or the distribution unit processing the data packet is located), the identification information of the SRB, the identification information of the logical channel, etc.

3.5.3) Length information of the information contained. For instance, 1 bit, 32 bits, 36 bits, etc.

3.6) Indication information of the priority of the Backhaul Link channel. For instance, "1" indicates the highest priority, "2" indicates the second priority, and "3" indicates the third priority, etc. After receiving this indication information, the first relay node may set the priority of the Backhaul Link channel according to the indication information of the priority. For instance, the priority of the logical channel corresponding to the Backhaul Link channel may be set according to this indication information.

3.7) Transmission configuration information of the information carried over the Backhaul Link channel (such as configuration information of SCTP), including at least one of the following information:
  a) Address information of the sender party (such as the central unit of the donor node, the distribution unit of the relay node) sending the information carried over the Backhaul Link, such as an IP address.
  b) Port information of the sender party (such as the central unit of the donor node, the distribution unit of the relay node) sending the information carried over the Backhaul Link.
  c) Identification information of SCTP (Stream Control Transmission Protocol) streams.
  d) Address information of the receiver party (such as the central unit of the donor node, the distribution unit of the relay node) receiving the information carried over the Backhaul Link, such as an IP address.
  e) Port information of the receiver party (such as the central unit of the donor node, the distribution unit of the relay node) receiving the information carried over the Backhaul Link.

In step S720_r, the first relay node sends a third configuration message to the donor node. The third configuration message may be a UE context setup response message, and the UE context modification response message.

In a specific embodiment, the third configuration message includes at least one of the following information:
  1) Identification information of relay node 2, such as the identification information of the mobile terminal of relay node 2.
  2) Information on the accepted SRB, such as an SRB ID.
  3) Information on the accepted Backhaul Link channel, such as the identification of the Backhaul Link channel.
  4) Information on the unaccepted SRB, such as an SRB ID.
  5) Information on the unaccepted Backhaul Link channel, such as the identification of the Backhaul Link channel.
  6) Configuration information generated by relay node 1, see CellGroupConfig in 3GPP TS38.473.

In other embodiments, the configuration information generated by relay node 1 further includes at least one of the following information:
  6.1) Configuration information of the RLC entity. For instance, information of one or more PDCP entities corresponding to the RLC entity, identification information of one or more SRBs corresponding to the RLC entity, etc.
  6.2) Configuration information of the Adapt protocol layer. The configuration information is used to configure the information added by the Adapt protocol layer for the data packet. For instance, the identification information of the relay node (in one embodiment, the relay node indicated by the identification information is the relay node at which the RRC layer and/or the distribution unit processing the data packet is located), the identification information of the SRB, the identification information of the logical channel, etc.

An effect of the configuration process above is, the first relay node can acquire information about the Backhaul Link (such as the type of the information carried), thereby generating different configuration information for different Backhaul Links (such as configuring priorities of different Backhaul Links), which in turn routes different types of messages to different Backhaul Link channels to transmit.

In step S730_r, the first relay node receives a fourth configuration message from the donor node. The fourth configuration message is generated by the central unit of the donor node (such as a DL RRC message transmission message) and sent by the distribution unit of the donor node to the distribution unit of relay node 1.

In a specific embodiment, the fourth configuration message includes at least one of the following information.
  1) Identification information of relay node 2, such as the identification information of the mobile terminal of the relay node 2.
  2) Configuration information generated by the central unit of the donor node and for configuring the mobile terminal portion of relay node 2, such as an RRCReconfiguration message (see 3GPP TS 38.331). The configuration information includes the configuration information generated by relay node 1 received in step 2. Further, the configuration information for configuring the mobile terminal portion of relay node 2 includes at least information related to the Backhaul Link channel, which includes at least one of the following information.
   Identification information of the Backhaul Link channel.
   Indication information of the type of the information carried over the Backhaul Link channel, such as an RRC message that does not contain the F1AP, an RRC message that contains the F1 AP, an F1AP message, an RRC message that contains F1AP message type 1, an F1AP message that contains F1AP message type 1, an RRC message that contains F1AP message type 2, an F1AP message that contains F1AP message type 2 . . . , an RRC message that contains F1 AP message type n, and F1AP message that contains F1 AP message type n, etc. The indication information may be explicit information or implicit information (for instance, the type of the information carried by the SRB can be obtained by using the SRB ID).
   Identification information of the SRB carried over the Backhaul Link channel, such as an SRB ID.
   Indication information on whether there is an Adapt protocol layer. If there is an Adapt protocol layer, it means that the Adapt protocol layer header is required to be added to the data packet from the upper layer (such as the PDCP layer or the RLC layer), and with regard to the data packet from the lower layer (such as the RLC layer or the MAC layer), it is required to read the content of the Adapt protocol layer and remove the Adapt protocol layer header. Further, the indication information may also indicate that the identification information of the relay node at which the RRC layer and/or the distribution unit processing the data packet is located is added (such as an ID of the relay node, an ID of the distribution unit of the relay node, an ID of the mobile terminal of the relay node, and an identification of the cell to which the mobile terminal portion of the relay node accesses, etc.).

Indication information of the information contained in the Adapt protocol layer. The indication information contains one of the following information:

Indication information of the types of information contained. For instance, the information contained is indication information of the identification information of the relay node, the information contained is indication information of the identification information of the SRB, the information contained is indication information of the identification information of the logical channel, etc.

The content of the information contained is at least one of the following information: the identification information of the relay node (in one embodiment, the relay node indicated by the identification information is the relay node at which the RRC layer and/or the distribution unit processing the data packet is located), the identification information of the SRB, the identification information of the logical channel, etc.

Length information of the information contained. For instance, 1 bit, 32 bits, 36 bits, etc.

Indication information of the priority of the Backhaul Link channel. For instance, "1" indicates the highest priority, "2" indicates the second priority, and "3" indicates the third priority, etc. After receiving this indication information, the first relay node may set the priority of the Backhaul Link channel according to the indication information of the priority. For instance, the priority of the logical channel corresponding to the Backhaul Link channel may be set according to this indication information.

Transmission configuration information of the information carried over the Backhaul Link channel (such as configuration information of SCTP), including at least one of the following information:

a) Address information of the sender party (such as the central unit of the donor node, the distribution unit of the relay node) sending the information carried over the Backhaul Link, such as an IP address.

b) Port information of the sender party (such as the central unit of the donor node, the distribution unit of the relay node) sending the information carried over the Backhaul Link.

c) Identification information of SCTP (Stream Control Transmission Protocol) streams.

d) Address information of the receiver party (such as the central unit of the donor node, the distribution unit of the relay node) receiving the information carried over the Backhaul Link, such as an IP address.

e) Port information of the receiver party (such as the central unit of the donor node, the distribution unit of the relay node) receiving the information carried over the Backhaul Link.

In step S740_r, the first relay node sends a second configuration message to the second relay node, wherein the second configuration message is used for configuring the transmission of an F1AP message with the second relay node. Specifically, the distribution unit of relay node 1 sends the configuration information regarding the mobile terminal portion of relay node 2 among the configuration messages generated by the central unit of the donor node to the mobile terminal portion of relay node 2.

The above steps S730_r and S740_r can be used alone for configuring the mobile terminal portion of relay node 2. An effect of the configuration process is, the second relay node can acquire information about the Backhaul Link (such as the type of the information carried), which in turn routes different types of messages to different Backhaul Link channels to transmit.

The effect of the procedure described above is in that: the central unit of the donor node can configure the distribution unit portion of relay node 1 and the mobile terminal portion of the relay node to perform the transmission of MT's F1AP and MT's RRC. The configuration process may configure relay node 2 and relay node 1 to perform transmissions according to any of the methods provided by the first aspect of the present disclosure.

Referring to FIG. 7, prior to step S710_r, the method further includes:

In step S706_r, the first relay node transmits the indication information to the donor node. Or prior to step S706_r, further including step S704_r, the first relay node receives the indication information from the second relay node. The information interaction procedure is as shown in FIG. 7. Relay node 1 transmits the indication information to the central unit of the donor node, or the mobile terminal portion of relay node 2 transmits the indication information to the distribution unit portion of relay node 1, which transmits the indication information to the central unit of the donor node.

In a specific embodiment, the indication information includes at least one of the following information:

1) Identification information of the relay node 2, such as the identification information of the mobile terminal portion of relay node 2, the identification information of the distribution unit portion of relay node 2, and an identification of relay node 2.

2) Indication information on successful configuration of relay node 2 by Operations, Administration, and Maintenance (OAM).

3) Indication information on the distribution unit portion of relay node 2 being able to work.

4) Indication information on that the distribution unit of relay node 2 needs to establish an F1 interface.

5) Indication information indicating that the node sending this indication message is a relay node.

Continue with reference to FIG. 7, with regard to the donor node, the configuration steps it performs include:

In step S710_a (step S710_r), the donor node sends a first configuration message to the first relay node, wherein the first configuration message is used for the transmission of an F1AP message with the second relay node.

In step S720_a (step S720_r), the donor node receives a third configuration message from the first relay node.

In step S730_a (step S730_r), the donor node sends a fourth configuration message to the first relay node.

The first configuration message, the third configuration message and the fourth configuration message in the above procedure correspond to the first configuration message, the third configuration message, and the fourth configuration message in the related operation on the first relay node respectively, and the descriptions of them will not repeated here.

In addition, the central unit of the donor node will trigger signaling interaction procedures of the SRB or the Backhaul Link channel for transmitting MT's F1AP, in response to receiving the message including the indication information from the first relay node.

To help understand the embodiments of the present disclosure, in FIG. 7, as examples of the first configuration message, UE CONTEXT SETUP REQUEST and UE CONTEXT SETUP RESPONSE are described. In the same way, as examples of the second configuration message, UE CONTEXT MODIFICATION REQUEST, UE CONTEXT MODIFICATION RESPONSE are described. However, the embodiments are not limited to the above examples.

In addition to the examples described above, it is also understood that other messages defined in the standard (e.g., 3GPP TS 38.473) include the above-described information (e.g., indication information, identification information), as an embodiment of the present disclosure. At least one of GNB-DU CONFIGURATION UPDATE, GNB-CU CONFIGURATION UPDATE, UE CONTEXT RELEASE COMMAND, UE CONTEXT MODIFICATION REQUIRED, WRITE-REPLACE WARNING REQUEST, PWS CANCEL REQUEST, GNB-DU RESOURCE COORDINATION REQUEST, GNB-DU CONFIGURATION UPDATE ACKNOWLEDGE, GNB-CU CONFIGURATION UPDATE ACKNOWLEDGE, UE CONTEXT RELEASE COMPLETE, UE CONTEXT MODIFICATION CONFIRM, WRITE-REPLACE WARNING RESPONSE, PWS CANCEL RESPONSE, GNB-DU RESOURCE COORDINATION RESPONSE can be reused. In one embodiment, the relay node 1 transmits UE CONTEXT MODIFICATION REQUIRED message including the above information in the third configuration message. The donor node (CU) transmits UE CONTEXT MODIFICATION CONFIRM message including the above information in the fourth configuration message. In this embodiment, the first configuration message can be omitted.

Furthermore, in some embodiments regarding in case of failure, the third configuration message can be UE CONTEXT SETUP FAILURE or UE CONTEXT MODIFICATION FAILURE. In case of using DU-initiated message, the fourth configuration message can be UE CONTEXT MODIFICATION REFUSE.

Figure 8:
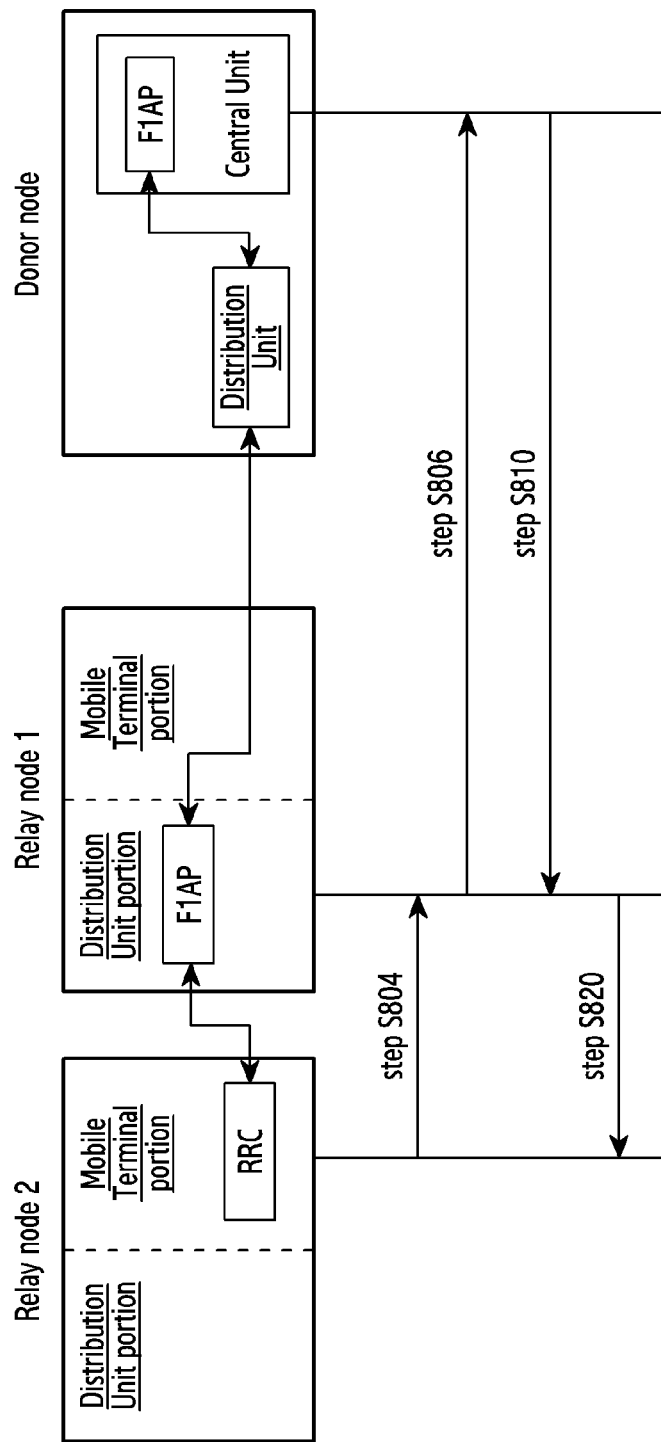
FIG. 8 illustrates a flow chart of a configuration method used for transmissions of control signaling in the relay network according to another embodiment of the present application.

Referring to FIG. 8, a configuration method according to another embodiment of the present application includes:

Step S810, the central unit of the donor node sends a first configuration message (such as a DL RRC message transmission message) to the distribution unit of relay node 1, and the first configuration message includes one of the following information:

1) Identification information of relay node 2, such as identification information of the mobile terminal of relay node 2.

2) Configuration information generated by the central unit of the donor node for configuring the mobile terminal portion of relay node 2, such as an RRCReconfiguration message (see 3GPP TS 38.331). In addition, the configuration information further includes at least one of the following information:

2.1) Indication information of one or more PDCP entities corresponding to the RLC entity.

2.2) Configuration information of the Adapt protocol layer, which is used to configure the information added for the data packet by the Adapt protocol layer, such as the identification information of the relay node (in one embodiment, the relay node indicated by the identification information is the relay node at which the RRC layer and/or the distribution unit processing the data packet is located), the identification information of the SRB, the identification information of the logical channel, etc.

3) Indication information on whether there is an Adapt protocol layer. If there is an Adapt protocol layer, it means that it is required to add the Adapt protocol layer header to the data packet from the upper layer (such as the PDCP layer or the RLC layer), and it is required to read the content of the Adapt protocol layer in the data packet from the lower layer (such as the RLC layer or the MAC layer), and remove the Adapt protocol layer header. Further, it may also indicate that the identification information of the relay node (such as an ID of the relay node, an ID of the distribution unit of the relay node, and an ID of the mobile terminal of the relay node, and an identification of the cell to which the mobile terminal portion of the relay node accesses, etc.) at which the RRC layer and/or the distribution unit processing the data packet is located be added.

4) Identification information of the SRB used for carrying the data packet to which the Adapt protocol layer needs to be added.

5) Identification information of the logical channel used for carrying the data packet to which the Adapt protocol layer needs to be added.

6) Identification information of the SRB used for carrying the data packet from which the Adapt protocol layer needs to be read.

7) Identification information of the logical channel used for carrying the data packet from which the Adapt protocol layer needs to be read.

Step S820, the distribution unit of relay node 1 sends the configuration information generated by the central unit of the donor node for configuring the mobile terminal portion of relay node 2 among the first configuration message to the mobile terminal portion of relay node 2.

In addition, prior to step S810, step S804 is optionally included: the mobile terminal portion of relay node 2 transmits the indication information to the distribution unit portion of relay node 1; and step S806: the distribution unit portion of relay node 1 takes the indication information to be included in the message and sends it to the central unit of the donor node; or alternatively, step S806 is optionally included: the distribution unit portion of relay node 1 takes the indication information to be included in the message and sends it to the central unit of the donor node. The indication information includes at least one of the following information:

1) Identification information of the relay node 2, such as the identification information of the mobile terminal portion of relay node 2, the identification information of the distribution unit portion of relay node 2, and an identification of relay node 2.

2) Indication information on successful configuration of relay node 2 by OAM.

3) Indication information on the distribution unit portion of relay node 2 being able to work.

4) Indication information on that the distribution unit of relay node 2 needs to establish an F1 interface.

5) Indication information indicating that the node sending this indication message is a relay node.

The central unit of the donor node will trigger steps S810 and S820 described above for configuring the SRB or the Backhaul Link channel used to transmit MT's F1AP, after receiving the above indication information.

One embodiment of the above procedures may be used to configure the procedures in which MT's F1AP and MT's RRC adopt the same Backhaul Link channel and are transmitted between relay node 1 and relay node 2.

The effect of this scheme is to configure one relay node to transmit control signaling with another relay node through an interaction of the configuration messages between the donor node and the relay node.

In other embodiments of the present application, there also provided separately a relay node in the relay network and a donor node in the relay network. The relay node includes: a receiving module configured to receive a first configuration message from a donor node, wherein the first configuration message is used for transmissions of an F1AP message with a second relay node; and a sending module configured to send the first configuration message to the second relay node, wherein the second configuration message is used for transmissions of the F1AP message with the second relay node. The donor node includes: a sending module configured to send a first configuration message to a first relay node, wherein the first configuration message is used for transmissions of an F1AP message with a second relay node. More detailed architectures can be obtained according to configuration methods aforementioned, and detailed descriptions are not repeated here again.

According to various embodiments, a method for transmitting control signaling in a relay network, the method comprising: a second relay node acquiring a first control signaling and a second control signaling, wherein the first control signaling contains an F1AP message; the second relay node processing the first control signaling and the second control signaling in the same manner or different manners; and the second relay node transmitting the first control signaling and the second control signaling to a first relay node.

In some embodiments, to process the first control signaling and the second control signaling in different manners, the second relay node uses a first signaling radio bearer to carry the first control signaling containing the F1 AP message, and uses a second signaling radio bearer to carry the second control signaling; or the second relay node uses different protocol layer entities to process the first control signaling and the second control signaling.

In some embodiments, wherein the first signaling radio bearer is one of the signaling radio bearers SRB0, SRB1, SRB1s, SRB2, SRB2s and SRB3; or the first signaling radio bearer is a new-defined signaling radio bearer.

In some embodiments, the first control signaling shares the same Backhaul Link channel with the second control signaling.

According to various embodiments, a configuration method for transmissions of control signaling in a relay network, the configuration method comprising: a first relay node receiving a first configuration message from a donor node, wherein the first configuration message is used for configuring a transmission of an F1AP message with a second relay node; and the first relay node sending a second configuration message to the second relay node, wherein the second configuration message is used for configuring a transmission of an F1AP message with the second relay node.

In some embodiments, wherein the first configuration message comprising at least one of: identification information of the second relay node, information of an SRB that is required to be established or modified and information of a Backhaul Link channel that is required to be established.

In some embodiments, the second configuration message comprising at least the configuration information generated by the donor node for configuring the second relay node.

In some embodiments, before the first relay node receives the first configuration message from the donor node, the first relay node receives indication information from the second relay node, and sends the indication information to the donor node; or sends indication information to the donor node.

In some embodiments, the indication information comprising at least one of: identification information of the second relay node, indication information indicating a successful configuration of the second relay node by OAM, indication information indicating a distribution unit portion of the second relay node being able to work, indication information indicating that a distribution unit of the second relay node needs to establish an F1 interface, and indication information indicating that the node sending this indication message is a relay node.

According to various embodiments, a configuration method for transmissions of control signaling in a relay network, the configuration method comprising: a donor node sending a first configuration message to a first relay node, wherein the first configuration message is used for configuring a transmission of an F1AP message with a second relay node.

In some embodiments, the first configuration message comprising at least one of: identification information of the second relay node, information of an SRB that is required to be established or modified and information of a Backhaul Link channel that is required to be established.

In some embodiments, before the donor node sends the first configuration message to the first relay node, the donor node receives indication information from the first relay node.

In some embodiments, the indication information comprising at least one of; identification information of the second relay node, indication information indicating a successful configuration of the second relay node by OAM, indication information indicating a distribution unit portion of the second relay node being able to work, indication information indicating that a distribution unit of the second relay node needs to establish an F1 interface, and indication information indicating that the node sending this indication message is a relay node.

According to various embodiments, a relay node in a relay network, the relay node comprising: receiving module, configured to receive a first configuration message from a donor node, wherein the first configuration message is used for configuring a transmission of an F1AP message with a second relay node; and sending module, configured to send a second configuration message to the second relay node, wherein the second configuration message is used for configuring a transmission of an F1AP message with a second relay node.

According to various embodiments, a donor node in a relay network, the donor node comprising: sending module, configured to send a first configuration message to a first relay node, wherein the first configuration message is used for configuring a transmission of an F1AP message with a second relay node.

Figure 9:
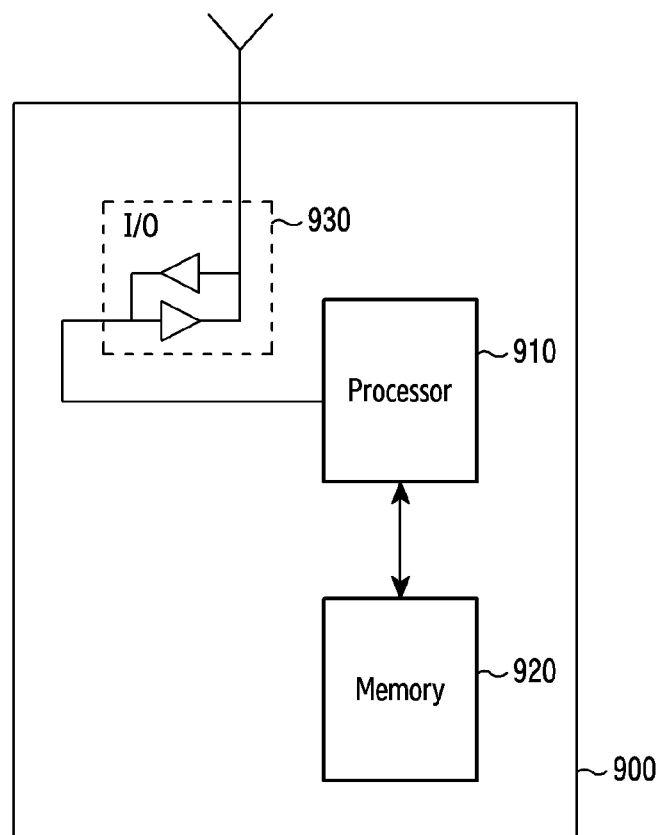
FIG. 9 schematically illustrates block diagram of a device according to an embodiment of the present application.

FIG. 9 schematically illustrates a block diagram of a device 900 according to an embodiment of the present application. The device 900 can be a communication node for performing operations in the above embodiments.

Referring to FIG. 9, device 900 includes a processor 910, such as a Digital Signal Processor (DSP). Processor 910 may be a single unit or a plurality of units to perform different actions according to embodiments of the present application. Device 900 may also include an input/output (I/O) unit 930 for receiving/transmitting signals from/to other entities. Although one processor is shown in FIG. 9, embodiments of the present disclosure may include one or more processors, depending on the capabilities of the communication node.

In addition, device 900 includes a memory 920. The memory 920 stores a basic program, an application, and data such as setting information for the operation of the device 900. The memory 920 may include volatile memory, non-volatile memory, or a combination of volatile memory and non-volatile memory. The memory 920 provides stored data in response to a request from the processor 910. The memory 920 may be in the form of a non-volatile or volatile memory, such as an Electrically Erasable Programmable Read Only Memory (EEPROM), a flash memory, etc. Memory 920 stores computer readable instructions, which when executed by processor 910 causes the processor to perform methods according to embodiments of the present application.

Although not shown in FIG. 9, the device 900 may further include a communication unit. In some embodiments, the device node 900 correspond to IAB node comprising DU portion and MT portion. The communication unit can transmit signals to other IAB node, UE, or IAB-donor. The communication unit can receive signals from other IAB node, UE, or IAB-donor. In some embodiments, the device nod 900 correspond to DU of IAB-donor. The communication unit can transmit signals to other IAB node or CU of IAB-donor. The communication unit comprises F1 interface unit. In some embodiments, the device nod 900 correspond to CU of IAB-donor. The communication unit can transmit signals to DU of IAB-donor. The communication unit comprises F1 interface unit.

Those skilled in the art will appreciate that above-mentioned methods are merely exemplary, and the methods of the present application are not limited to the steps and the sequences described above. The above device may include more modules, such as modules that have been developed or to be developed in the future for base stations or UEs and the like may also be included. The above-mentioned identifications are merely exemplary but not limiting, and the present application is not limited to these specific cells which are examples of such identifications. Many changes and modifications can be made by those skilled in the art in light of the teachings of the illustrated embodiments.

It should be understood that the above-mentioned embodiments of the present application can be implemented by software, hardware, or a combination of both software and hardware. For instance, various components within the device in the above embodiments may be implemented by various devices including, but not limited to, analog circuit devices, digital circuit devices, digital signal processing circuits, programmable processors, Application Specific Integrated Circuits (ASIC), Field Programmable Gate Arrays (FPGA), Programmable Logic Devices (CPLD), etc.

In the present application, "base station" refers to a mobile communication data and control switching center having a relatively large transmission power and a relatively wide coverage area, with functions of resource allocation scheduling, data reception and transmission, etc. "User equipment" refers to a user mobile terminal, for instance, including a terminal equipment such as a mobile phone, a notebook, etc., which can perform wireless communication with a base station or a micro base station.

Moreover, embodiments of the present application disclosed herein can be implemented on a computer program product. More specifically, the computer program product is a product having a computer readable medium encoded with computer program logic, which when executed on a computing device, provides related operations to implement the above technical solutions of the present application. When executed on at least one processor of a computing system, the computer program logic causes the processor to perform the operations (methods) described in the present application. Such a configuration of the present application is typically provided as software, code, and/or other data structures arranged or encoded on a computer readable medium such as an optical medium (such as CD-ROM), a floppy disk, or a hard disk, or other mediums such as firmware or microcode on one or more ROM or RAM or PROM chips, or downloadable software images, shared databases in one or more modules, etc. Software or firmware or such a configuration may be installed on the computing device such that one or more processors in the computing device perform the technical solutions described in embodiments of the present application.

While the present application has been shown and described with reference to the preferred embodiments thereof, it will be understood by those skilled in the art that various changes, alternatives and modifications may be made therein without departing from the spirit and scope of the present application. Therefore, the present application should not be defined by the embodiments described above, but by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a central unit (CU) of a donor node in a communication system, the method comprising:
   generating a configuration message including:
      address information of a receiving node over a backhaul link channel,
      channel identification information for the backhaul link channel, wherein the backhaul link channel comprises a radio link control (RLC) channel used for a link between a first integrated access and backhaul (IAB) node of a distributed unit (DU) and the receiving node, and
      indication information for indicating a type of information carried over the backhaul link channel, wherein the type of information is one of types including a user equipment (UE) associated F1 application protocol (F1AP) signaling or a non-UE associated F1AP signaling; and
   transmitting, to the first IAB node, the configuration message; and
   transmitting, to the first IAB node, a radio resource control (RRC) reconfiguration message including identification information of a logical channel corresponding to the backhaul link channel and information about priority of the logical channel corresponding to the backhaul link channel.

2. The method of claim 1,
   wherein the RRC reconfiguration message further includes channel identification information for one or more backhaul link channels.

3. The method of claim 1, wherein the indication information for indicating the type of information is associated with a control plane.

4. A method performed by a first integrated access and backhaul (IAB) node for a distributed unit (DU) in a communication system, the method comprising:
- receiving, from a central unit (CU) of a donor node, a configuration message including:
  - address information of a receiving node over a backhaul link channel,
  - channel identification information for the backhaul link channel, wherein the backhaul link channel comprises a radio link control (RLC) channel used for a link between the first TAB node and the receiving node, and
  - indication information for indicating a type of information carried over the backhaul link channel, wherein the type of information is one of types including a user equipment (UE) associated F1 application protocol (F1AP) signaling or a non-UE associated F1AP signaling, and
- receiving, from the CU of the donor node, a radio resource control (RRC) reconfiguration message including identification information of a logical channel corresponding to the backhaul link channel and information about priority of the logical channel corresponding to the backhaul link channel.

5. The method of claim 4,
wherein the RRC reconfiguration message further includes channel identification information for each backhaul link channel.

6. The method of claim 4, wherein the indication information for indicating the type of information is associated with a control plane.

7. A central unit (CU) of a donor node in a communication system, the CU comprising:
- at least one transceiver; and
- at least one processor coupled to the at least one transceiver, configured to:
  - generate a configuration message including:
    - address information of a receiving node over a backhaul link channel, and
    - channel identification information for the backhaul link channel, wherein the backhaul link channel comprises a radio link control (RLC) channel used for a link between a first integrated access and backhaul (IAB) node of a distributed unit (DU) and the receiving node, and
    - indication information for indicating a type of information carried over the backhaul link channel, wherein the type of information is one of types including a user equipment (UE) associated F1 application protocol (F1AP) signaling or a non-UE associated F1AP signaling; and
  - transmit, to the first IAB node via the at least one transceiver, the configuration message,
  - transmit, to the first IAB node, a radio resource control (RRC) reconfiguration message including identification information of a logical channel corresponding to the backhaul link channel and information about priority of the logical channel corresponding to the backhaul link channel.

8. The CU of claim 7,
wherein the RRC reconfiguration message further includes channel identification information for each backhaul link channel.

9. The CU of the claim 7, wherein the indication information for indicating the type of information is associated with a control plane.

10. A first integrated access and backhaul (IAB) node for a distributed unit (DU) in a communication system, the IAB node comprising:
- at least one transceiver; and
- at least one processor coupled to the at least one transceiver, configured to control the at least one transceiver to:
- receive, from a central unit (CU) of a donor node, a configuration message including:
  - address information of a receiving node over a backhaul link channel,
  - channel identification information for the backhaul link channel, wherein the backhaul link channel comprises a radio link control (RLC) channel used for a link between the first IAB node and the receiving node, and
  - indication information for indicating a type of information carried over the backhaul link channel, wherein the type of information is one of types including a user equipment (UE) associated F1 application protocol (F1AP) signaling or a non-UE associated F1AP signaling, and
- receive, from the CU of the donor node, a radio resource control (RRC) reconfiguration message including identification information of a logical channel corresponding to the backhaul link channel and information about priority of the logical channel corresponding to the backhaul link channel.

11. The first IAB node of claim 10,
wherein the RRC reconfiguration message further includes channel identification information for each backhaul link channel.

12. The first IAB node of claim 10, wherein the indication information for indicating the type of information is associated with a control plane.

* * * * *